(12) United States Patent
Zhang et al.

(10) Patent No.: US 10,554,997 B2
(45) Date of Patent: Feb. 4, 2020

(54) VIDEO CODING/DECODING METHOD, ENCODER, AND DECODER

(71) Applicant: Huawei Technologies Co., Ltd., Shenzhen (CN)

(72) Inventors: Hong Zhang, Shenzhen (CN); Haitao Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 41 days.

(21) Appl. No.: 15/797,728

(22) Filed: Oct. 30, 2017

(65) Prior Publication Data

US 2018/0070099 A1 Mar. 8, 2018

Related U.S. Application Data

(63) Continuation of application No. PCT/CN2016/078970, filed on Apr. 11, 2016.

(30) Foreign Application Priority Data

May 26, 2015 (CN) .......................... 2015 1 0274936

(51) Int. Cl.
*H04N 19/513* (2014.01)
*H04N 19/139* (2014.01)
(Continued)

(52) U.S. Cl.
CPC ......... *H04N 19/513* (2014.11); *H04N 19/139* (2014.11); *H04N 19/172* (2014.11);
(Continued)

(58) Field of Classification Search
CPC .. H04N 19/139; H04N 19/172; H04N 19/176; H04N 19/182; H04N 19/44;
(Continued)

(56) References Cited

U.S. PATENT DOCUMENTS 5,502,493 A * 3/1996 Meyer ................... H03M 7/425
375/240.05
2005/0094727 A1 5/2005 Ha et al.
(Continued)

FOREIGN PATENT DOCUMENTS

CN 1127969 A 7/1996
CN 1518833 A 8/2004
(Continued)

OTHER PUBLICATIONS

Chen, L., et al., "Low-cost multiple-hypothesis motion compensation for internet video coding," XP030058708, ISO/IEC JTC1/SC29/WG11 MPEG2013/M30180, Jul. 2013, 6 pages.
(Continued)

*Primary Examiner* — Dominic D Saltarelli
(74) *Attorney, Agent, or Firm* — Conley Rose, P.C.

(57) ABSTRACT

A video coding method includes obtaining a first motion vector field (MVF) set, obtaining a plurality of second MVFs according to the first MVF set and based on a preset vector operation method, determining a motion compensation prediction (MCP) signal of the target sub picture block from M MCP reference pictures according to the plurality of second MVFs and based on an MCP algorithm, obtaining a prediction residual of the target sub picture block according to a picture signal of the target sub picture block and the MCP signal of the target sub picture block, performing coding processing on the prediction residual of the target sub picture block to obtain a coded signal of the prediction residual of the target sub picture block, and sending the coded signal of the prediction residual of the target sub picture block to a peer decoder.

20 Claims, 7 Drawing Sheets

(51) Int. Cl.
   *H04N 19/176* (2014.01)
   *H04N 19/573* (2014.01)
   *H04N 19/58* (2014.01)
   *H04N 19/172* (2014.01)
   *H04N 19/182* (2014.01)
   *H04N 19/44* (2014.01)
   *H04N 19/51* (2014.01)

(52) U.S. Cl.
   CPC ......... *H04N 19/176* (2014.11); *H04N 19/182* (2014.11); *H04N 19/44* (2014.11); *H04N 19/573* (2014.11); *H04N 19/58* (2014.11); *H04N 19/51* (2014.11)

(58) Field of Classification Search
   CPC .... H04N 19/51; H04N 19/513; H04N 19/573; H04N 19/58
   USPC ..................................................... 375/240.05
   See application file for complete search history.

(56) References Cited

U.S. PATENT DOCUMENTS

| | | |
|---|---|---|
| 2007/0230572 A1 | 10/2007 | Koto et al. |
| 2011/0110429 A1 | 5/2011 | La et al. |
| 2012/0027088 A1 | 2/2012 | Chien et al. |
| 2012/0281763 A1 | 11/2012 | Suzuki |
| 2013/0202041 A1 | 8/2013 | Chiu et al. |
| 2014/0044183 A1 | 2/2014 | Kondo et al. |
| 2016/0080775 A1 | 3/2016 | Pyun et al. |
| 2017/0048547 A1 | 2/2017 | Kondo et al. |

FOREIGN PATENT DOCUMENTS

| | | | |
|---|---|---|---|
| CN | 1612613 | A | 5/2005 |
| CN | 102055977 | A | 5/2011 |
| CN | 103039074 | A | 4/2013 |
| CN | 103916673 | A | 7/2014 |
| EP | 1335609 | A2 | 8/2003 |
| WO | 2014092249 | A1 | 6/2014 |

OTHER PUBLICATIONS

Tang, C., et al., "Unidirectional Motion Compensated Temporal Interpolation," XP010236357, Proceedings of 1997 IEEE International Symposium on Circuits and System, vol. 2, Jun. 9, 1997, 4 pages.
Kamp, S., et al. "Multihypothesis Prediction using Decoder Side Motion Vector Derivation in Inter Frame Video Coding," Visual Communications and Image Processing, XP030081712, Jan. 20, 2009, 8 pages.
Flierl, M., et al., "A Video Codec Incorporating Black-Based Multi-Hypothesis Motion-Compensated Prediction," XP055212013, Proceedings of the SPIE Conference on Visual Communications and Image Processing, Jun. 2000, 12 pages.
Foreign Communication From a Counterpart Application, European Application No. 16799132.2, Extended European Search Report dated Feb. 9, 2018, 16 pages.
Machine Translation and Abstract of Chinese Publication No. CN103916673, Jul. 9, 2014, 86 pages.
Tai, S., et al., "A Multi-Pass True Motion Estimation Scheme With Motion Vector Propagation for Frame Rate Up-Conversion Applications," Journal of Display Technology, vol. 4, No. 2, Jun. 2008, pp. 188-197.
Klomp, S., et al., "Decoder-Side Hierarchical Motion Estimation for Dense Vector Fields," Picture Coding Symposium, Nagoya, Japan, Dec. 8-10, 2010, pp. 362-365.
Verri, A., et al. "Motion Field and Optical Flow: Qualitative Properties," IEEE Transactions on Pattern Analysis and Machine Intelligence, vol. 11, No. 5, May 1989, pp. 490-498.
Foreign Communication From a Counterpart Application, PCT Application No. PCT/CN2016/078970, English Translation of International Search Report dated Jul. 14, 2016, 2 pages.
Foreign Communication From a Counterpart Application, PCT Application No. PCT/CN2016/078970, English Translation of Written Opinion dated Jul. 14, 2016, 6 pages.
Machine Translation and Abstract of Chinese Publication No. CN1127969, Jul. 31, 1996, 14 pages.
Foreign Communication From a Counterpart Application, Chinese Application No. 201510274936.8, Chinese Search Report dated Oct. 18, 2018, 3 pages.
Foreign Communication From a Counterpart Application, Chinese Application No. 201510274936.8, Chinese Office Action dated Oct. 29, 2018, 3 pages.

* cited by examiner

VIDEO CODING/DECODING METHOD, ENCODER, AND DECODER

CROSS-REFERENCE TO RELATED APPLICATIONS

This application is a continuation of International Patent Application No. PCT/CN2016/078970 filed on Apr. 11, 2016, which claims priority to Chinese Patent Application No. 201510274936.8 filed on May 26, 2015. The disclosures of the aforementioned applications are hereby incorporated by reference in their entireties.

TECHNICAL FIELD

The present application relates to the field of video coding/decoding technologies, and in particular, to a video coding/decoding method, an encoder, and a decoder.

BACKGROUND

A motion vector field (MVF) is used to precisely describe motion vector information of a picture relative to another picture. Given a to-be-coded picture and a reference picture, an MVF of the to-be-coded picture relative to the reference picture includes a motion vector of each unit in the to-be-coded picture, in the reference picture. The unit is a 1×1 pixel unit, or a pixel unit with a size of 2×1, 1×3, 3×4, or the like.

An inter-frame coding technology based on an MVF generally includes the following steps. An encoder first performs motion estimation to generate an MVF, then performs a motion compensation prediction (MCP) operation based on the MVF and a reference picture to obtain a prediction signal of a to-be-coded picture, then obtains a residual signal of the to-be-coded picture through computation according to a picture signal of the to-be-coded picture and the prediction signal of the to-be-coded picture, and performs transformation, quantization, and entropy coding operations on the residual signal of the to-be-coded picture.

In an existing MCP solution based on an MVF, only one reference picture can be used. When a residual of the to-be-coded picture relative to the reference picture is large, the video coding technology provided by other approaches leads to low coding efficiency.

SUMMARY

Embodiments of the present application provide a video coding/decoding method, an encoder, and a decoder to improve coding efficiency of a to-be-processed picture to some extent.

According to a first aspect, an embodiment of the present application provides a video coding method, where the method includes obtaining a first MVF set, where the first MVF set includes an MVF of each of at least one picture relative to one or more MVF reference pictures thereof, the at least one picture is located in one video frame sequence, the MVF reference picture of each of the at least one picture is also located in the video frame sequence, and each of the at least one picture is different from the MVF reference picture thereof, obtaining multiple second MVFs according to the first MVF set and based on a preset vector operation method, where each of the multiple second MVFs is an MVF of a target sub picture block in a to-be-processed picture relative to each of M MCP reference pictures of the to-be-processed picture, the to-be-processed picture is located in the video frame sequence, the to-be-processed picture is divided into multiple non-overlapping sub picture blocks, the target sub picture block is located in the multiple non-overlapping sub picture blocks, and the MCP reference pictures are coded pictures in the video frame sequence, or the MCP reference pictures are intermediate pictures obtained by processing coded pictures in the video frame sequence, where M is an integer greater than or equal to 2, determining an MCP signal of the target sub picture block from the M MCP reference pictures according to the multiple second MVFs and based on an MCP algorithm, obtaining a prediction residual of the target sub picture block according to a picture signal of the target sub picture block and the MCP signal of the target sub picture block, performing coding process on the prediction residual of the target sub picture block to obtain a coded signal of the prediction residual of the target sub picture block, and sending the coded signal of the prediction residual of the target sub picture block to a peer decoder.

With reference to the first aspect, in a first possible implementation of the first aspect, obtaining the prediction residual of the target sub picture block according to a picture signal of the target sub picture block and the MCP signal of the target sub picture block includes subtracting a pixel value of a corresponding pixel in the MCP signal of the target sub picture block from a pixel value of each pixel included in the picture signal of the target sub picture block to obtain the prediction residual of the target sub picture block, where the picture signal of the target sub picture block includes multiple pixels, the MCP signal of the target sub picture block also includes multiple pixels, and for each pixel included in the picture signal of the target sub picture block, the corresponding pixel exists in the MCP signal of the target sub picture block.

With reference to the first aspect or the first possible implementation of the first aspect, in a second possible implementation of the first aspect, when the at least one picture includes the to-be-processed picture, a quantity of MVF reference pictures of the to-be-processed picture is less than or equal to M.

With reference to the first aspect, the first possible implementation of the first aspect, or the second possible implementation of the first aspect, in a third possible implementation of the first aspect, after obtaining multiple second MVFs according to the first MVF set and based on a preset vector operation method, the method further includes determining a first MVF that is located in the first MVF set and participates in an operation, where the first MVF that participates in the operation is a first MVF that participates in the preset vector operation method to obtain the second MVF, marking the first MVF that is located in the first MVF set and participates in the operation to obtain identification information used to mark the first MVF that participates in the operation, performing coding process on the identification information to obtain coded data of the identification information, and sending the coded data of the identification information to the decoder.

With reference to any one of the first aspect, or the first possible implementation of the first aspect to the third possible implementation of the first aspect, in a fourth possible implementation of the first aspect, the method further includes performing coding process on the preset vector operation method to obtain coded data of the preset vector operation method, and sending the coded data of the preset vector operation method to the decoder.

With reference to any one of the first aspect, or the first possible implementation of the first aspect to the fourth possible implementation of the first aspect, in a fifth possible implementation of the first aspect, after obtaining the first MVF set, and before obtaining multiple second MVFs according to the first MVF set and based on a preset vector operation method, the method further includes performing lossy compression coding process on the first MVF set to obtain lossy compression coded data of the first MVF set.

With reference to the fifth possible implementation of the first aspect, in a sixth possible implementation of the first aspect, obtaining the multiple second MVFs according to the first MVF set and based on a preset vector operation method includes performing decoding process on the lossy compression coded data of the first MVF set to obtain a third MVF set, and obtaining the multiple second MVFs according to the third MVF set, a picture sequence number of each of the at least one picture, and a picture sequence number of the MVF reference picture thereof, and based on the preset vector operation method.

With reference to the fifth possible implementation of the first aspect or the sixth possible implementation of the first aspect, in a seventh possible implementation of the first aspect, transmitting the lossy compression coded data of the first MVF set to the decoder.

With reference to any one of the first aspect, or the first possible implementation of the first aspect to the fourth possible implementation of the first aspect, in an eighth possible implementation of the first aspect, after obtaining the first MVF set, and before obtaining the multiple second MVFs according to the first MVF set and based on a preset vector operation method, the method further includes performing lossless compression coding process on the first MVF set to obtain lossless compression coded data of the first MVF set.

With reference to the eighth possible implementation of the first aspect, in a ninth possible implementation of the first aspect, obtaining the multiple second MVFs according to the first MVF set and based on a preset vector operation method includes performing decoding process on the lossless compression coded data of the first MVF set to obtain the first MVF set, and obtaining the multiple second MVFs according to the first MVF set, a picture sequence number of each of the at least one picture, and a picture sequence number of the MVF reference picture thereof, and based on the preset vector operation method.

With reference to the eighth possible implementation of the first aspect or the ninth possible implementation of the first aspect, in a tenth possible implementation of the first aspect, transmitting the lossless compression coded data of the first MVF set to the decoder.

With reference to any one of the first aspect, or the first possible implementation of the first aspect to the tenth possible implementation of the first aspect, in an eleventh possible implementation of the first aspect, when the first MVF set includes an MVF of each of N pictures relative to an MVF reference picture thereof, where N is an integer greater than or equal to 1, a total quantity of MVF reference pictures of the N pictures is P, and P is an integer greater than or equal to N, obtaining the multiple second MVFs according to the first MVF set and based on a preset vector operation method includes determining P first relative picture sequence numbers, where each of the P first relative picture sequence numbers is a picture sequence number of each of the N pictures relative to each MVF reference picture thereof, determining M second relative picture sequence numbers, where each of the M second relative picture sequence numbers is a picture sequence number of the to-be-processed picture relative to each of the M MCP reference pictures, obtaining P×M scaling ratios, where each of the P×M scaling ratios is a ratio of each of the P first relative picture sequence numbers to each of the M second relative picture sequence numbers, and performing processing according to the following operation method for a $Q^{th}$ scaling ratio for each of the P×M scaling ratios in order to obtain the P×M second MVFs, where when a first relative picture sequence number corresponding to the $Q^{th}$ scaling ratio is a picture sequence number of a $U^{th}$ picture in the N pictures relative to a $V^{th}$ MVF reference picture of the $U^{th}$ picture, scaling process is performed on an MVF of the $U^{th}$ picture relative to the $V^{th}$ MVF reference picture of the $U^{th}$ picture according to a $Q^{th}$ scaling ratio to obtain the $Q^{th}$ second MVF.

With reference to the eleventh possible implementation of the first aspect, in a twelfth possible implementation of the first aspect, determining an MCP signal of the target sub picture block from the M MCP reference pictures according to the multiple second MVFs and based on an MCP algorithm includes determining P×M MCP signals of the target sub picture block from corresponding MCP reference pictures according to each of the P×M second MVFs and based on the MCP algorithm, and obtaining the prediction residual of the target sub picture block according to a picture signal of the target sub picture block and the MCP signal of the target sub picture block includes obtaining P×M residual signals of the target sub picture block according to the picture signal of the target sub picture block and each of the P×M MCP signals of the target sub picture block, and selecting, from the P×M residual signals, a residual signal with lowest energy as the prediction residual of the target sub picture block.

With reference to any one of the first aspect, or the first possible implementation of the first aspect to the tenth possible implementation of the first aspect, in a thirteenth possible implementation of the first aspect, when the first MVF set includes an MVF of each of N pictures relative to an MVF reference picture thereof, where N is an integer greater than or equal to 1, a total quantity of MVF reference pictures of the N pictures is P, the first MVF set includes P first MVFs, and P is an integer greater than or equal to N, obtaining the multiple second MVFs according to the first MVF set and based on a preset vector operation method includes determining an optimal MVF from the P first MVFs, where the optimal MVF is a first MVF that makes energy of the prediction residual of the target sub picture block lowest in the P first MVFs, and determining a third relative picture sequence number, when the optimal MVF is an MVF of an $E^{th}$ picture in the N pictures relative to a $G^{th}$ MVF reference picture in F MVF reference pictures of the $E^{th}$ picture, where E is an integer greater than or equal to 1 but less than or equal to N, F is an integer greater than or equal to 1, and G is an integer greater than or equal to 1 but less than or equal to F, where the third relative picture sequence number is a picture sequence number of the $E^{th}$ picture relative to the $G^{th}$ MVF reference picture in the F MVF reference pictures of the $E^{th}$ picture, determining M second relative picture sequence numbers, where each of the M second relative picture sequence numbers is a picture sequence number of the to-be-processed picture relative to each of the M MCP reference pictures, and performing, according to a ratio of the third relative picture sequence number to each of the M second relative picture sequence numbers, scaling process on the MVF of the $E^{th}$ picture relative to the $G^{th}$ MVF reference picture in the F MVF reference pictures of the $E^{th}$ picture to obtain the M second MVFs.

With reference to the thirteenth possible implementation of the first aspect, in a fourteenth possible implementation of the first aspect, determining an MCP signal of the target sub picture block from the M MCP reference pictures according to the multiple second MVFs and based on an MCP algorithm includes determining M MCP signals of the target sub picture block according to each of the M second MVFs and a corresponding MCP reference picture and based on the MCP algorithm, and obtaining the prediction residual of the target sub picture block according to a picture signal of the target sub picture block and the MCP signal of the target sub picture block further includes determining M residual signals of the target sub picture block according to the picture signal of the target sub picture block and the M MCP signals of the target sub picture block, and selecting, from the M residual signals, a residual signal with lowest energy as the prediction residual of the target sub picture block.

With reference to any one of the first aspect, or the first possible implementation of the first aspect to the tenth possible implementation of the first aspect, in a fifteenth possible implementation of the first aspect, the first MVF set includes a first MVF $mvf(t_1,t)$ of the to-be-processed picture relative to a first picture, a first MVF $mvf(t_2,t_1)$ of the first picture relative to a second picture, a first MVF $mvf(t_3,t_2)$ of the second picture relative to a third picture, . . . , a first MVF $mvf(t',t_k)$ of a $K^{th}$ picture relative to an MCP reference picture of the to-be-processed picture, where K is an integer greater than or equal to 3, and obtaining the multiple second MVFs according to the first MVF set and based on a preset vector operation method includes obtaining the second MVF $mvf(t',t)$ according to a formula $mvf(t',t)=mvf(t',t_k)+ \ldots + mvf(t_3,t_2)+mvf(t_2,t_1)+mvf(t_1,t)$.

According to a second aspect, an embodiment of the present application further provides a video decoding method, where the method includes receiving compression coded data of a first MVF set, and performing decoding process on the compression coded data of the first MVF set to obtain the first MVF set, where the first MVF set includes an MVF of each of at least one picture relative to one or more MVF reference pictures thereof, the at least one picture is located in one video frame sequence, the MVF reference picture of each of the at least one picture is also located in the video frame sequence, and each of the at least one picture is different from the MVF reference picture thereof, receiving coded data of identification information, and performing decoding process on the coded data of the identification information to obtain the identification information, where the identification information is used to mark a first MVF that is located in the first MVF set and participates in a vector operation, the first MVF that participates in the operation is a first MVF that participates in the vector operation according to a preset vector operation method to obtain a second MVF, the second MVF is an MVF of a target sub picture block in a to-be-processed picture relative to each of M MCP reference pictures of the to-be-processed picture, the to-be-processed picture is located in the video frame sequence, the to-be-processed picture is divided into multiple non-overlapping sub picture blocks, the target sub picture block is located in the multiple non-overlapping sub picture blocks, and the MCP reference pictures are coded pictures in the video frame sequence, or the MCP reference pictures are intermediate pictures obtained by processing coded pictures in the video frame sequence, where M is an integer greater than or equal to 2, determining, according to the first MVF set and the mark information, the first MVF that participates in the vector operation, receiving coded data of the preset vector operation method, performing decoding process on the coded data of the preset vector operation method to obtain the preset vector operation method, obtaining multiple second MVFs according to the first MVFs that participate in the vector operation and according to the preset vector operation method, and determining an MCP signal of the target sub picture block from the M MCP reference pictures according to the multiple second MVFs and based on an MCP algorithm, where the method further includes receiving a coded signal of a prediction residual of the target sub picture block, performing decoding process on the coded signal of the prediction residual of the target sub picture block to obtain the prediction residual of the target sub picture block, and obtaining a picture signal of the target sub picture block according to the MCP signal of the target sub picture block and the prediction residual of the target sub picture block.

With reference to the second aspect, in a first possible implementation of the second aspect, obtaining the picture signal of the target sub picture block according to the MCP signal of the target sub picture block and the prediction residual of the target sub picture block includes adding a pixel value of a corresponding pixel in the prediction residual of the target sub picture block to a pixel value of each pixel included in the MCP signal of the target sub picture block to obtain the picture signal of the target sub picture block, where the MCP signal of the target sub picture block includes multiple pixels, the prediction residual of the target sub picture block also includes multiple pixels, and for each pixel included in the MCP signal of the target sub picture block, the corresponding pixel exists in the prediction residual of the target sub picture block.

With reference to the second aspect or the first possible implementation of the second aspect, in a second possible implementation of the second aspect, when the first MVFs that participate in the vector operation include an MVF of each of N pictures relative to an MVF reference picture thereof, where a total quantity of MVF reference pictures of the N pictures is P, N is an integer greater than or equal to 1, and P is an integer greater than or equal to N, obtaining the multiple second MVFs according to the first MVFs that participate in the vector operation and according to the preset vector operation method further includes determining P first relative picture sequence numbers, where each of the P first relative picture sequence numbers is a picture sequence number of each of the N pictures relative to each of MVF reference pictures thereof, determining M second relative picture sequence numbers, where each of the M second relative picture sequence numbers is a picture sequence number of the to-be-processed picture relative to each of the M MCP reference pictures, obtaining P×M scaling ratios, where each of the P×M scaling ratios is a ratio of each of the P first relative picture sequence numbers to each of the M second relative picture sequence numbers, and performing processing according to the following operation method for a $Q^{th}$ scaling ratio for each of the P×M scaling ratios in order to obtain the P×M second MVFs, where when a first relative picture sequence number corresponding to the $Q^{th}$ scaling ratio is a picture sequence number of a $U^{th}$ picture in the N pictures relative to a $V^{th}$ MVF reference picture of the $U^{th}$ picture, scaling process is performed on an MVF of the $U^{th}$ picture relative to the $V^{th}$ MVF reference picture of the $U^{th}$ picture according to a $Q^{th}$ scaling ratio to obtain the $Q^{th}$ second MVF.

With reference to the second possible implementation of the second aspect, in a third possible implementation of the second aspect, determining an MCP signal of the target sub picture block from the M MCP reference pictures according to the multiple second MVFs and based on an MCP algorithm includes determining P×M MCP signals of the target sub picture block from corresponding MCP reference pictures according to each of the P×M second MVFs and based on the MCP algorithm.

With reference to the third possible implementation of the second aspect, in a fourth possible implementation of the second aspect, obtaining the picture signal of the target sub picture block according to the MCP signal of the target sub picture block and the prediction residual of the target sub picture block includes obtaining P×M predictive picture signals of the target sub picture block according to each of the P×M MCP signals of the target sub picture block and residual signals of the target sub picture block, and selecting, from the P×M predictive picture signals, a predictive picture signal with lowest energy as the picture signal of the target sub picture block.

With reference to the second aspect or the first possible implementation of the second aspect, in a fifth possible implementation of the second aspect, when the first MVF set includes an MVF of each of N pictures relative to an MVF reference picture thereof, where N is an integer greater than or equal to 1, a total quantity of MVF reference pictures of the N pictures is P, the first MVF set includes P first MVFs, and P is an integer greater than or equal to N, obtaining the multiple second MVFs according to the first MVFs that participate in the vector operation and according to the preset vector operation method includes determining an optimal MVF from the P first MVFs, where the optimal MVF is a first MVF that makes energy of the prediction residual of the target sub picture block lowest in the P first MVFs, and determining a third relative picture sequence number when the optimal MVF is an MVF of an $E^{th}$ picture in the N pictures relative to a $G^{th}$ MVF reference picture in F MVF reference pictures of the $E^{th}$ picture, where E is an integer greater than or equal to 1 but less than or equal to N, F is an integer greater than or equal to 1, and G is an integer greater than or equal to 1 but less than or equal to F, where the third relative picture sequence number is a picture sequence number of the $E^{th}$ picture relative to the $G^{th}$ MVF reference picture in the F MVF reference pictures of the $E^{th}$ picture, determining M second relative picture sequence numbers, where each of the M second relative picture sequence numbers is a picture sequence number of the to-be-processed picture relative to each of the M MCP reference pictures, and performing, according to a ratio of the third relative picture sequence number to each of the M second relative picture sequence numbers, scaling process on the MVF of the $E^{th}$ picture relative to the $G^{th}$ MVF reference picture in the F MVF reference pictures of the $E^{th}$ picture to obtain the M second MVFs.

With reference to the fifth possible implementation of the second aspect, in a sixth possible implementation of the second aspect, determining an MCP signal of the target sub picture block from the M MCP reference pictures according to the multiple second MVFs and based on an MCP algorithm includes determining M MCP signals of the target sub picture block according to each of the M second MVFs and a corresponding MCP reference picture and based on the MCP algorithm.

With reference to the sixth possible implementation of the second aspect, in a seventh possible implementation of the second aspect, obtaining the picture signal of the target sub picture block according to the MCP signal of the target sub picture block and the prediction residual of the target sub picture block further includes obtaining M predictive picture signals of the target sub picture block according to the M MCP signals of the target sub picture block and the prediction residual of the target sub picture block, and selecting, from the M predictive picture signals, a predictive picture signal with lowest energy as the picture signal of the target sub picture block.

With reference to the second aspect or the first possible implementation of the second aspect, in an eighth possible implementation of the second aspect, the first MVFs that participate in the vector operation include a first MVF $mvf(t_1,t)$ of the to-be-processed picture relative to a first picture, a first MVF $mvf(t_2,t_1)$ of the first picture relative to a second picture, a first MVF $mvf(t_3,t_2)$ of the second picture relative to a third picture, . . . , a first MVF $mvf(t',t_k)$ of a $K^{th}$ picture relative to an MCP reference picture of the to-be-processed picture, where K is an integer greater than or equal to 3, and obtaining the multiple second MVFs according to the first MVFs that participate in the vector operation and according to the preset vector operation method includes obtaining the second MVF $mvf(t',t)$ according to a formula $mvf(t',t)=mvf(t',t_k)+ \ldots +mvf(t_3,t_2)+mvf(t_2,t_1)+mvf(t_1, t)$.

According to a third aspect, an embodiment of the present application provides an encoder, including an obtaining unit configured to obtain a first MVF set, where the first MVF set includes an MVF of each of at least one picture relative to one or more MVF reference pictures thereof, the at least one picture is located in one video frame sequence, the MVF reference picture of each of the at least one picture is also located in the video frame sequence, and each of the at least one picture is different from the MVF reference picture thereof, an operation unit configured to obtain multiple second MVFs according to the first MVF set and based on a preset vector operation method, where each of the multiple second MVFs is an MVF of a target sub picture block in a to-be-processed picture relative to each of M MCP reference pictures of the to-be-processed picture, the to-be-processed picture is located in the video frame sequence, the to-be-processed picture is divided into multiple non-overlapping sub picture blocks, the target sub picture block is located in the multiple non-overlapping sub picture blocks, and the MCP reference pictures are coded pictures in the video frame sequence, or the MCP reference pictures are intermediate pictures obtained by processing coded pictures in the video frame sequence, where M is an integer greater than or equal to 2, an MCP unit configured to determine an MCP signal of the target sub picture block from the M MCP reference pictures according to the second MVFs and based on an MCP algorithm, a processing unit configured to obtain a prediction residual of the target sub picture block according to a picture signal of the target sub picture block and the MCP signal of the target sub picture block, and an encoding unit configured to perform coding process on the prediction residual of the target sub picture block to obtain a coded signal of the prediction residual of the target sub picture block, and send the coded signal of the prediction residual of the target sub picture block to a peer decoder.

With reference to the third aspect, in a first possible implementation of the third aspect, the processing unit is further configured to subtract a pixel value of a corresponding pixel in the MCP signal of the target sub picture block from a pixel value of each pixel included in the picture signal of the target sub picture block to obtain the prediction residual of the target sub picture block, where the picture signal of the target sub picture block includes multiple pixels, the MCP signal of the target sub picture block also includes multiple pixels, and for each pixel included in the picture signal of the target sub picture block, the corresponding pixel exists in the MCP signal of the target sub picture block.

With reference to the third aspect or the first possible implementation of the third aspect, in a second possible implementation of the third aspect, when the at least one picture includes the to-be-processed picture, a quantity of MVF reference pictures of the to-be-processed picture is less than or equal to M.

With reference to the third aspect, the first possible implementation of the third aspect, or the second possible implementation of the third aspect, in a third possible implementation of the third aspect, the encoder further includes a determining unit and a marking unit, where after the multiple second MVFs are obtained according to the first MVF set and based on the preset vector operation method, determining unit is configured to determine a first MVF that is located in the first MVF set and participates in an operation, where the first MVF that participates in the operation is a first MVF that participates in the preset vector operation method to obtain the second MVF, the marking unit is configured to mark the first MVF that is located in the first MVF set and participates in the operation to obtain identification information used to mark the first MVF that participates in the operation, and the encoding unit is further configured to perform coding process on the identification information to obtain coded data of the identification information, and send the coded data of the identification information to the decoder.

With reference to any one of the third aspect, or the first possible implementation of the third aspect to the third possible implementation of the third aspect, in a fourth possible implementation of the third aspect, the encoding unit is further configured to perform coding process on the preset vector operation method to obtain coded data of the preset vector operation method, and send the coded data of the preset vector operation method to the decoder.

With reference to any one of the third aspect, or the first possible implementation of the third aspect to the fourth possible implementation of the third aspect, in a fifth possible implementation of the third aspect, after the obtaining unit obtains the first MVF set, and before the operation unit obtains the multiple second MVFs by performing an operation, the encoding unit is further configured to perform lossy compression coding process on the first MVF set to obtain lossy compression coded data of the first MVF set.

With reference to the fifth possible implementation of the third aspect, in a sixth possible implementation of the third aspect, the operation unit is further configured to perform decoding process on the lossy compression coded data of the first MVF set to obtain a third MVF set, and obtain the multiple second MVFs according to the third MVF set, a picture sequence number of each of the at least one picture, and a picture sequence number of the MVF reference picture thereof, and based on the preset vector operation method.

With reference to the fifth possible implementation of the third aspect or the sixth possible implementation of the third aspect, in a seventh possible implementation of the third aspect, the encoding unit is further configured to transmit the lossy compression coded data of the first MVF set to the decoder.

With reference to any one of the third aspect, or the first possible implementation of the third aspect to the fourth possible implementation of the third aspect, in an eighth possible implementation of the third aspect, after the obtaining unit obtains the first MVF set, and before the operation unit obtains the multiple second MVFs by performing an operation, the encoding unit is further configured to perform lossless compression coding process on the first MVF set to obtain lossless compression coded data of the first MVF set.

With reference to the eighth possible implementation of the third aspect, in a ninth possible implementation of the third aspect, the operation unit is further configured to perform decoding process on the lossless compression coded data of the first MVF set to obtain the first MVF set, and obtain the multiple second MVFs according to the first MVF set, a picture sequence number of each of the at least one picture, and a picture sequence number of the MVF reference picture thereof, and based on the preset vector operation method.

With reference to the eighth possible implementation of the third aspect or the ninth possible implementation of the third aspect, in a tenth possible implementation of the third aspect, the encoding unit is further configured to transmit the lossless compression coded data of the first MVF set to the decoder.

With reference to any one of the third aspect, or the first possible implementation of the third aspect to the tenth possible implementation of the third aspect, in an eleventh possible implementation of the third aspect, when the first MVF set includes an MVF of each of N pictures relative to an MVF reference picture thereof, where N is an integer greater than or equal to 1, a total quantity of MVF reference pictures of the N pictures is P, and P is an integer greater than or equal to N, the operation unit is further configured to determine P first relative picture sequence numbers, where each of the P first relative picture sequence numbers is a picture sequence number of each of the N pictures relative to each of MVF reference pictures thereof, determine M second relative picture sequence numbers, where each of the M second relative picture sequence numbers is a picture sequence number of the to-be-processed picture relative to each of the M MCP reference pictures, obtain P×M scaling ratios, where each of the P×M scaling ratios is a ratio of each of the P first relative picture sequence numbers to each of the M second relative picture sequence numbers, and perform processing according to the following operation method for a $Q^{th}$ scaling ratio for each of the P×M scaling ratios in order to obtain the P×M second MVFs, where when a first relative picture sequence number corresponding to the $Q^{th}$ scaling ratio is a picture sequence number of a $U^{th}$ picture in the N pictures relative to a $V^{th}$ MVF reference picture of the $U^{th}$ picture, scaling process is performed on an MVF of the $U^{th}$ picture relative to the $V^{th}$ MVF reference picture of the $U^{th}$ picture according to a $Q^{th}$ scaling ratio to obtain the $Q^{th}$ second MVF.

With reference to the eleventh possible implementation of the third aspect, in a twelfth possible implementation of the third aspect, the MCP unit is further configured to determine P×M MCP signals of the target sub picture block from corresponding MCP reference pictures according to each of the P×M second MVFs and based on the MCP algorithm, obtain P×M residual signals of the target sub picture block according to the picture signal of the target sub picture block and each of the P×M MCP signals of the target sub picture block, and select, from the P×M residual signals, a residual signal with lowest energy as the prediction residual of the target sub picture block.

With reference to any one of the third aspect, or the first possible implementation of the third aspect to the tenth possible implementation of the third aspect, in a thirteenth possible implementation of the third aspect, when the first MVF set includes an MVF of each of N pictures relative to an MVF reference picture thereof, where N is an integer greater than or equal to 1, a total quantity of MVF reference pictures of the N pictures is P, the first MVF set includes P first MVFs, and P is an integer greater than or equal to N, the operation unit is further configured to determine an optimal MVF from the P first MVFs, where the optimal MVF is a first MVF that makes energy of the prediction residual of the target sub picture block lowest in the P first MVFs, and determine a third relative picture sequence number when the optimal MVF is an MVF of an $E^{th}$ picture in the N pictures relative to a $G^{th}$ MVF reference picture in F MVF reference pictures of the $E^{th}$ picture, where E is an integer greater than or equal to 1 but less than or equal to N, F is an integer greater than or equal to 1, and G is an integer greater than or equal to 1 but less than or equal to F, where the third relative picture sequence number is a picture sequence number of the $E^{th}$ picture relative to the $G^{th}$ MVF reference picture in the F MVF reference pictures of the $E^{th}$ picture, determine M second relative picture sequence numbers, where each of the M second relative picture sequence numbers is a picture sequence number of the to-be-processed picture relative to each of the M MCP reference pictures, and perform, according to a ratio of the third relative picture sequence number to each of the M second relative picture sequence numbers, scaling process on the MVF of the $E^{th}$ picture relative to the $G^{th}$ MVF reference picture in the F MVF reference pictures of the $E^{th}$ picture, to obtain the M second MVFs.

With reference to the thirteenth possible implementation of the third aspect, in a fourteenth possible implementation of the third aspect, the MCP unit is further configured to determine M MCP signals of the target sub picture block according to each of the M second MVFs and a corresponding MCP reference picture and based on the MCP algorithm, determine M residual signals of the target sub picture block according to the picture signal of the target sub picture block and the M MCP signals of the target sub picture block, and select, from the M residual signals, a residual signal with lowest energy as the prediction residual of the target sub picture block.

With reference to any one of the third aspect, or the first possible implementation of the third aspect to the tenth possible implementation of the third aspect, in a fifteenth possible implementation of the third aspect, the first MVF set includes a first MVF $mvf(t_1,t)$ of the to-be-processed picture relative to a first picture, a first MVF $mvf(t_2,t_1)$ of the first picture relative to a second picture, a first MVF $mvf(t_3,t_2)$ of the second picture relative to a third picture, . . . , a first MVF $mvf(t',t_k)$ of a $K^{th}$ picture relative to an MCP reference picture of the to-be-processed picture, where K is an integer greater than or equal to 3, and the operation unit is further configured to obtain the second MVF $mvf(t',t)$ according to a formula $mvf(t',t)=mvf(t',t_k)+ \ldots +mvf(t_3,t_2)+mvf(t_2,t_1)+mvf(t_1,t)$.

According to a fourth aspect, an embodiment of the present application provides a decoder, including a receiving unit configured to receive compression coded data of a first MVF set, and perform decoding process on the compression coded data of the first MVF set to obtain the first MVF set, where the first MVF set includes an MVF of each of at least one picture relative to one or more MVF reference pictures thereof, the at least one picture is located in one video frame sequence, the MVF reference picture of each of the at least one picture is also located in the video frame sequence, and each of the at least one picture is different from the MVF reference picture thereof, where the receiving unit is further configured to receive coded data of identification information, and perform decoding process on the coded data of the identification information to obtain the identification information, where the identification information is used to mark a first MVF that is located in the first MVF set and participates in a vector operation, the first MVF that participates in the operation is a first MVF that participates in the vector operation according to a preset vector operation method to obtain a second MVF, the second MVF is an MVF of a target sub picture block in a to-be-processed picture relative to each of M MCP reference pictures of the to-be-processed picture, the to-be-processed picture is located in the video frame sequence, the to-be-processed picture is divided into multiple non-overlapping sub picture blocks, the target sub picture block is located in the multiple non-overlapping sub picture blocks, and the MCP reference pictures are coded pictures in the video frame sequence, or the MCP reference pictures are intermediate pictures obtained by processing coded pictures in the video frame sequence, where M is an integer greater than or equal to 2, a determining unit configured to determine, according to the first MVF set and the mark information, the first MVF that participates in the vector operation, where the receiving unit is further configured to receive coded data of the preset vector operation method, and perform decoding process on the coded data of the preset vector operation method to obtain the preset vector operation method, an operation unit configured to obtain the multiple second MVFs according to the first MVFs that participate in the vector operation and according to the preset vector operation method, an MCP unit configured to determine an MCP signal of the target sub picture block from the M MCP reference pictures according to the second MVFs and based on an MCP algorithm, where the receiving unit is further configured to receive a coded signal of a prediction residual of the target sub picture block, and perform decoding process on the coded signal of the prediction residual of the target sub picture block to obtain the prediction residual of the target sub picture block, and a processing unit configured to obtain a picture signal of the target sub picture block according to the MCP signal of the target sub picture block and the prediction residual of the target sub picture block.

With reference to the fourth aspect, in a first possible implementation of the fourth aspect, the processing unit is further configured to add a pixel value of a corresponding pixel in the prediction residual of the target sub picture block to a pixel value of each pixel included in the MCP signal of the target sub picture block to obtain the picture signal of the target sub picture block, where the MCP signal of the target sub picture block includes multiple pixels, the prediction residual of the target sub picture block also includes multiple pixels, and for each pixel included in the MCP signal of the target sub picture block, the corresponding pixel exists in the prediction residual of the target sub picture block.

With reference to the fourth aspect or the first possible implementation of the fourth aspect, in a second possible implementation of the fourth aspect, when the first MVFs that participate in the vector operation include an MVF of each of N pictures relative to an MVF reference picture thereof, where a total quantity of MVF reference pictures of the N pictures is P, N is an integer greater than or equal to 1, and P is an integer greater than or equal to N, the operation unit is further configured to determine P first relative picture sequence numbers, where each of the P first relative picture sequence numbers is a picture sequence number of each of the N pictures relative to each of MVF reference pictures thereof, determine M second relative picture sequence numbers, where each of the M second relative picture sequence numbers is a picture sequence number of the to-be-processed picture relative to each of the M MCP reference pictures, obtain P×M scaling ratios, where each of the P×M scaling ratios is a ratio of each of the P first relative picture sequence numbers to each of the M second relative picture sequence numbers, and perform processing according to the following operation method for a $Q^{th}$ scaling ratio for each of the P×M scaling ratios in order to obtain the P×M second MVFs, where when a first relative picture sequence number corresponding to the $Q^{th}$ scaling ratio is a picture sequence number of a $U^{th}$ picture in the N pictures relative to a $V^{th}$ MVF reference picture of the $U^{th}$ picture, scaling process is performed on an MVF of the $U^{th}$ picture relative to the $V^{th}$ MVF reference picture of the $U^{th}$ picture according to a $Q^{th}$ scaling ratio to obtain the $Q^{th}$ second MVF.

With reference to the second possible implementation of the fourth aspect, in a third possible implementation of the fourth aspect, the MCP unit is further configured to determine P×M MCP signals of the target sub picture block from corresponding MCP reference pictures according to each of the P×M second MVFs and based on the MCP algorithm.

With reference to the third possible implementation of the fourth aspect, in a fourth possible implementation of the fourth aspect, the processing unit is further configured to obtain P×M predictive picture signals of the target sub picture block according to each of the P×M MCP signals of the target sub picture block and residual signals of the target sub picture block, and select, from the P×M predictive picture signals, a predictive picture signal with lowest energy as the picture signal of the target sub picture block.

With reference to the fourth aspect or the first possible implementation of the fourth aspect, in a fifth possible implementation of the fourth aspect, when the first MVF set includes an MVF of each of N pictures relative to an MVF reference picture thereof, where N is an integer greater than or equal to 1, a total quantity of MVF reference pictures of the N pictures is P, the first MVF set includes P first MVFs, and P is an integer greater than or equal to N, the operation unit is further configured to determine an optimal MVF from the P first MVFs, where the optimal MVF is a first MVF that makes energy of the prediction residual of the target sub picture block lowest in the P first MVFs, and determine a third relative picture sequence number when the optimal MVF is an MVF of an $E^{th}$ picture in the N pictures relative to a $G^{th}$ MVF reference picture in F MVF reference pictures of the $E^{th}$ picture, where E is an integer greater than or equal to 1 but less than or equal to N, F is an integer greater than or equal to 1, and G is an integer greater than or equal to 1 but less than or equal to F, where the third relative picture sequence number is a picture sequence number of the $E^{th}$ picture relative to the $G^{th}$ MVF reference picture in the F MVF reference pictures of the $E^{th}$ picture, determine M second relative picture sequence numbers, where each of the M second relative picture sequence numbers is a picture sequence number of the to-be-processed picture relative to each of the M MCP reference pictures, and perform, according to a ratio of the third relative picture sequence number to each of the M second relative picture sequence numbers, scaling process on the MVF of the $E^{th}$ picture relative to the $G^{th}$ MVF reference picture in the F MVF reference pictures of the $E^{th}$ picture, to obtain the M second MVFs.

With reference to the fifth possible implementation of the fourth aspect, in a sixth possible implementation of the fourth aspect, the MCP unit is further configured to determine M MCP signals of the target sub picture block according to each of the M second MVFs and a corresponding MCP reference picture and based on the MCP algorithm.

With reference to the sixth possible implementation of the fourth aspect, in a seventh possible implementation of the fourth aspect, the processing unit is further configured to obtain M predictive picture signals of the target sub picture block according to the M MCP signals of the target sub picture block and the prediction residual of the target sub picture block, and select, from the M predictive picture signals, a predictive picture signal with lowest energy as the picture signal of the target sub picture block.

With reference to the fourth aspect or the first possible implementation of the fourth aspect, in an eighth possible implementation of the fourth aspect, the first MVFs that participate in the vector operation include a first MVF $mvf(t_1,t)$ of the to-be-processed picture relative to a first picture, a first MVF $mvf(t_2,t_1)$ of the first picture relative to a second picture, a first MVF $mvf(t_3,t_2)$ of the second picture relative to a third picture, . . . , a first MVF $mvf(t',t_k)$ of a $K^{th}$ picture relative to an MCP reference picture of the to-be-processed picture, where K is an integer greater than or equal to 3, and the operation unit is further configured to obtain the second MVF $mvf(t',t)$ according to a formula $mvf(t',t)=mvf(t',t_k)+ \ldots +mvf(t_3,t_2)+mvf(t_2,t_1)+mvf(t_1,t)$.

According to a fifth aspect, an embodiment of the present application further provides a coding/decoding system, where the system includes the encoder according to any one of the possible implementations of the third aspect and the decoder according to any one of the possible implementations of the fourth aspect, where the encoder is configured to perform coding process on a picture signal to obtain a coding result of the picture signal, and send the coding result of the picture signal to the decoder, and the decoder is configured to receive the coding result of the picture signal, and perform decoding process on the coding result of the picture signal to obtain the picture signal.

As can be known from above, in the technical solution provided by an embodiment of the present application, first, a first MVF set is obtained, where the first MVF set includes an MVF of each of at least one picture relative to an MVF reference picture thereof, then a second MVF is obtained according to the first MVF set and based on a preset vector operation method, where the second MVF is an MVF of a target sub picture block in a to-be-processed picture relative to each of M MCP reference pictures of the to-be-processed picture, then an MCP signal of the target sub picture block is determined from the M MCP reference pictures according to the second MVF and based on an MCP algorithm, a prediction residual of the target sub picture block is obtained according to a picture signal of the target sub picture block and the MCP signal of the target sub picture block, and then coding process is performed on the prediction residual of the target sub picture block to obtain a coded signal of the prediction residual of the target sub picture block. In this solution, a quantity of MCP reference pictures is M, and M is an integer greater than or equal to 2. That is, in comparison with the other approaches, the technical solution provided by this embodiment of the present application supports MCP using multiple reference frames. In comparison with MCP using a single reference frame in the other approaches, in most cases, a prediction residual of a target sub picture block that is finally determined using this solution is less than a prediction residual of a target sub picture block when a single reference frame is used in the other approaches. Therefore, in most cases, coding efficiency of a target sub picture block is improved.

BRIEF DESCRIPTION OF DRAWINGS

To describe the technical solutions in the embodiments of the present application more clearly, the following briefly describes the accompanying drawings required for describing the embodiments. The accompanying drawings in the following description show merely some embodiments of the present application, and a person of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. The described embodiments are some but not all of the embodiments of the present application. All other embodiments obtained by a person of ordinary skill in the art based on the embodiments of the present application without creative efforts shall fall within the protection scope of the present application.

Before the technical solutions provided by the embodiments of the present application are described, the following terms are first explained for ease of understanding this application document.

1. MVF reference picture: It is an MVF reference picture, and is a reference picture for generating an MVF.

2. MCP reference picture: It is an MCP reference picture, and is a reference picture used for MCP.

Embodiment 1

Figure 1A:
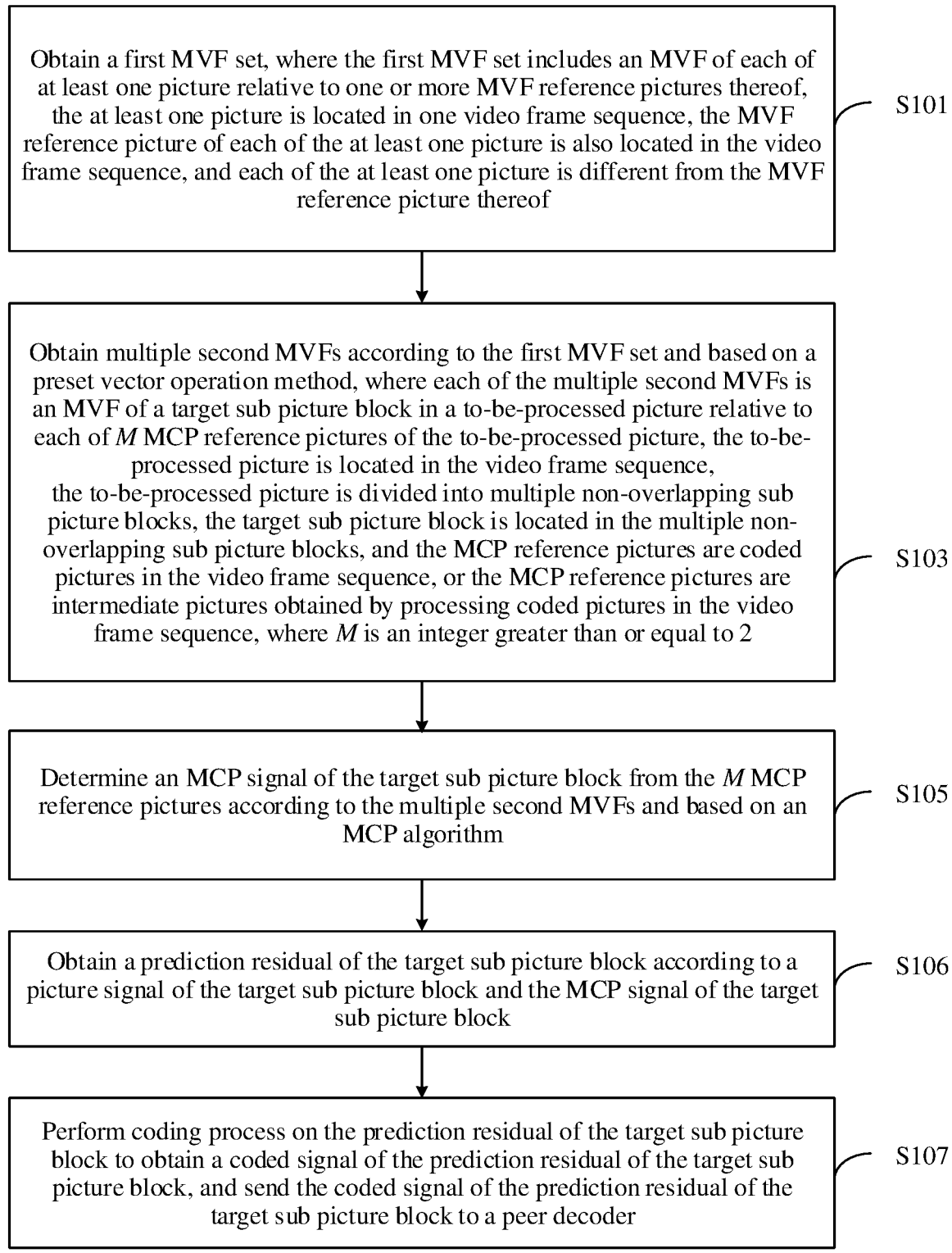
FIG. 1A is a schematic flowchart of a video coding method according to an embodiment of the present application.

Referring to FIG. 1A, FIG. 1A is a schematic flowchart of a video coding method according to this embodiment of the present application. The video coding method is applied to an encoder. The video coding method provided by this embodiment of the present application includes the following steps.

Step S101: Obtain a first MVF set, where the first MVF set includes an MVF of each of at least one picture relative to one or more MVF reference pictures thereof, the at least one picture is located in one video frame sequence, the MVF reference picture of each of the at least one picture is also located in the video frame sequence, and each of the at least one picture is different from the MVF reference picture thereof.

Step S103: Obtain multiple second MVFs according to the first MVF set and based on a preset vector operation method, where each of the multiple second MVFs is an MVF of a target sub picture block in a to-be-processed picture relative to each of M MCP reference pictures of the to-be-processed picture, the to-be-processed picture is located in the video frame sequence, the to-be-processed picture is divided into multiple non-overlapping sub picture blocks, the target sub picture block is located in the multiple non-overlapping sub picture blocks, and the MCP reference pictures are coded pictures in the video frame sequence, or the MCP reference pictures are intermediate pictures obtained by processing coded pictures in the video frame sequence, where M is an integer greater than or equal to 2.

It should be noted that, an MVF may have different granularities. For example, if each pixel is used as a basic unit indicated by a motion vector, a granularity of the MVF is marked with 1×1, and if each set of 2×2 pixels is used as a basic unit indicated by a motion vector, a granularity of the MVF is marked with 2×2. In the technical solution provided by this embodiment of the present application, the 1×1 granularity is used as an example for description.

It should be noted that, the to-be-processed picture may be located in the at least one picture, or may not be located in the at least one picture. For different cases, the preset vector operation method also varies. When the at least one picture includes the to-be-processed picture, a quantity of MVF reference pictures of the to-be-processed picture is less than or equal to M, that is, the quantity of MVF reference pictures of the to-be-processed picture is less than the quantity of MCP reference pictures of the to-be-processed picture.

It should be noted that, the technical solution provided by this embodiment of the present application further includes performing coding process on the preset vector operation method to obtain coded data of the preset vector operation method, and sending the coded data of the preset vector operation method to a decoder.

Step S105: Determine an MCP signal of the target sub picture block from the M MCP reference pictures according to the multiple second MVFs and based on an MCP algorithm.

Step S106: Obtain a prediction residual of the target sub picture block according to a picture signal of the target sub picture block and the MCP signal of the target sub picture block.

Further, obtaining the prediction residual of the target sub picture block according to a picture signal of the target sub picture block and the MCP signal of the target sub picture block includes subtracting a pixel value of a corresponding pixel in the MCP signal of the target sub picture block from a pixel value of each pixel included in the picture signal of the target sub picture block to obtain the prediction residual of the target sub picture block, where the picture signal of the target sub picture block includes multiple pixels, the MCP signal of the target sub picture block also includes multiple pixels, and for each pixel included in the picture signal of the target sub picture block, the corresponding pixel exists in the MCP signal of the target sub picture block.

Step S107: Perform coding process on the prediction residual of the target sub picture block to obtain a coded signal of the prediction residual of the target sub picture block, and send the coded signal of the prediction residual of the target sub picture block to a peer decoder.

Figure 1B:
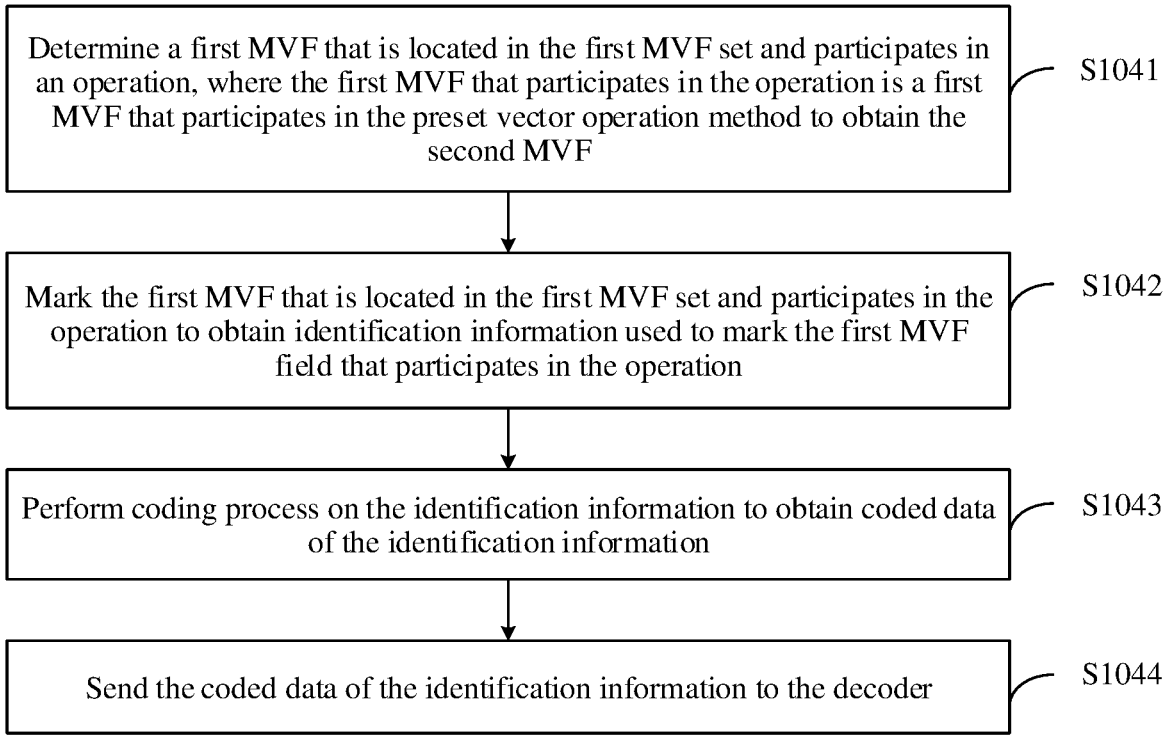
FIG. 1B is a schematic flowchart of a video coding method further defined on a basis of FIG. 1A.

It should be noted that, referring to FIG. 1B, after obtaining the second MVFs according to the first MVF set and based on a preset vector operation method in step S103, the technical solution provided by this embodiment of the present application further includes the following steps.

Step S1041: Determine a first MVF that is located in the first MVF set and participates in an operation, where the first MVF that participates in the operation is a first MVF that participates in the preset vector operation method to obtain the second MVF.

Generally, the first MVF that participates in the operation is a proper subset of the first MVF set.

Step S1042: Mark the first MVF that is located in the first MVF set and participates in the operation to obtain identification information used to mark the first MVF that participates in the operation.

It should be noted that, when the first MVF that participates in the operation includes a first MVF of the to-be-processed picture, and selection of an MVF reference picture of the to-be-processed picture and an MCP reference picture of the to-be-processed picture meets a specific relationship, performing coding process on the first MVF of the to-be-processed picture herein may be implemented in the following manner of performing joint coding on indication information of the MVF reference picture of the to-be-processed picture and the MCP reference picture of the to-be-processed picture. For example, the MVF reference picture of the to-be-processed picture is a picture closest to the to-be-processed picture, among the MCP reference pictures of the to-be-processed picture. In this case, only an index value needs to be coded to indicate a location of the MVF reference picture of the to-be-processed picture, among the MCP reference pictures of the to-be-processed picture. If the selection of the MVF reference picture of the to-be-processed picture meets a certain rule, for example, is one frame or two frames before the to-be-processed picture, the mode is coded before the video sequence is coded. A most flexible manner is to mark, on the to-be-processed picture, the location of the MVF reference picture of the to-be-processed picture. The location is generally indicated by a distance between the MVF reference picture and the to-be-processed picture, for example, indicated by picture order count (POC) difference (ΔPOC) in the high efficiency video coding (HEVC) standard.

Step S1043: Perform coding process on the identification information to obtain coded data of the identification information.

Step S1044: Send the coded data of the identification information to the decoder.

Further, after step S101 and before step S103, the technical solution provided by this embodiment of the present application includes performing lossy compression coding process on the first MVF set to obtain lossy compression coded data of the first MVF set. Correspondingly, obtaining the second MVFs according to the first MVF set and based on a preset vector operation method in step S103 includes performing decoding process on the lossy compression coded data of the first MVF set to obtain a third MVF set, and obtaining the second MVFs according to the third MVF set, a picture sequence number of each of the at least one picture, and a picture sequence number of the MVF reference picture thereof, and based on the preset vector operation method.

It should be noted that, after obtaining the lossy compression coded data of the first MVF set, the video coding method provided by this embodiment of the present application further includes transmitting the lossy compression coded data of the first MVF set to the decoder.

In another embodiment of the present application, after step S101 and before step S103, the technical solution provided by this embodiment of the present application further includes performing lossless compression coding process on the first MVF set to obtain lossless compression coded data of the first MVF set. Correspondingly, obtaining the second MVFs according to the first MVF set and based on a preset vector operation method in step S103 includes performing decoding process on the lossless compression coded data of the first MVF set to obtain the first MVF set, and obtaining the second MVFs according to the first MVF set, a picture sequence number of each of the at least one picture, and a picture sequence number of the MVF reference picture thereof, and based on the preset vector operation method.

It should be noted that, after obtaining the lossless compression coded data of the first MVF set, the video coding method provided by this embodiment of the present application further includes transmitting the lossless compression coded data of the first MVF set to the decoder.

In an embodiment of the present application, when the first MVF set includes an MVF of each of N pictures relative to an MVF reference picture thereof, where N is an integer greater than or equal to 1, a total quantity of MVF reference pictures of the N pictures is P, and P is an integer greater than or equal to N, obtaining the second MVFs according to the first MVF set and based on a preset vector operation method includes determining P first relative picture sequence numbers, where each of the P first relative picture sequence numbers is a picture sequence number of each of the N pictures relative to each of MVF reference pictures thereof, determining M second relative picture sequence numbers, where each of the M second relative picture sequence numbers is a picture sequence number of the to-be-processed picture relative to each of the M MCP reference pictures, obtaining P×M scaling ratios, where each of the P×M scaling ratios is a ratio of each of the P first relative picture sequence numbers to each of the M second relative picture sequence numbers, and performing processing according to the following operation method for a $Q^{th}$ scaling ratio for each of the P×M scaling ratios in order to obtain the P×M second MVFs, where when a first relative picture sequence number corresponding to the $Q^{th}$ scaling ratio is a picture sequence number of a $U^{th}$ picture in the N pictures relative to a $V^{th}$ MVF reference picture of the $U^{th}$ picture, scaling process is performed on an MVF of the $U^{th}$ picture relative to the $V^{th}$ MVF reference picture of the $U^{th}$ picture according to a $Q^{th}$ scaling ratio to obtain the $Q^{th}$ second MVF.

It should be noted that, in this embodiment of the present application, scaling process is performed on the first MVF to obtain the second MVF. For example, scaling process may be performed on a known MVF $mvf(t_1',t_1)$ to obtain a second MVF mvf(t',t), further, $$mvf(t', t) = mvf(t_1', t_1) \times \frac{t - t'}{t_1 - t_1'},$$

where t indicates a moment of the to-be-processed picture, t' indicates a moment of the MCP reference picture of the to-be-processed picture, $t_1$ indicates a moment of a picture located in the video frame sequence, $t_1'$ indicates a moment of an MVF reference picture of the picture located in the video frame sequence, and when $t_1=t$, $mvf(t_1',t_1)$ indicates a first MVF of the to-be-processed picture.

Figure 1C:
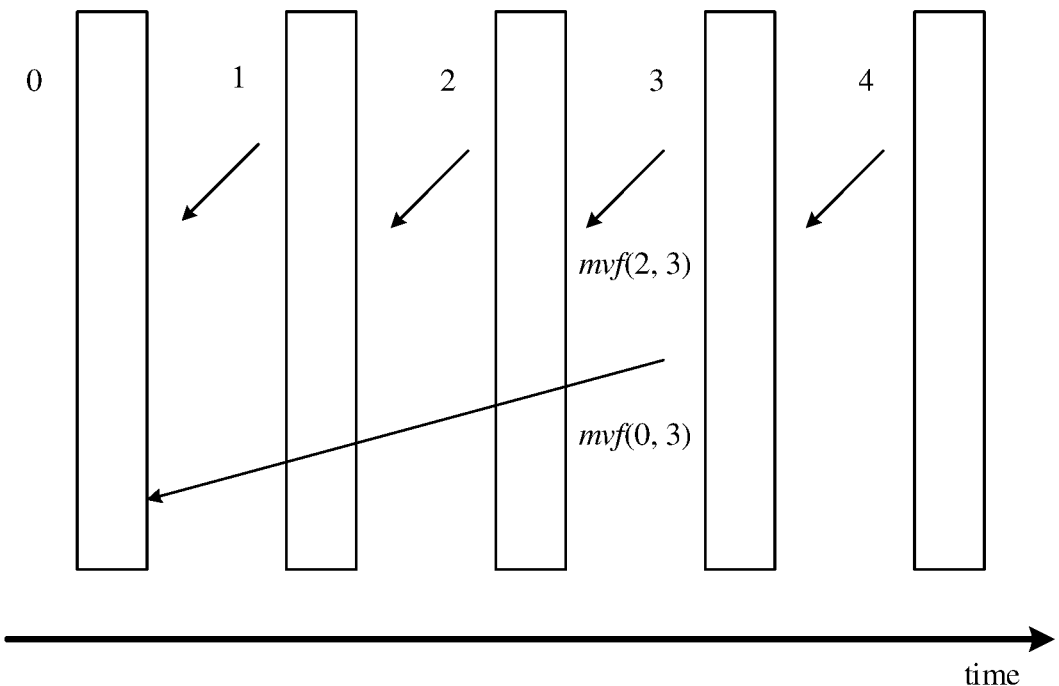
FIG. 1C is a schematic diagram of a scenario of a video coding method according to an embodiment of the present application.

Referring to FIG. 1C, assuming that the to-be-processed picture is a picture whose POC is 3, and the MCP reference picture of the to-be-processed picture is a picture whose POC is 0, and the MVF reference picture of the to-be-processed picture is a picture whose POC is 2, where a first MVF mvf(2,3) of the to-be-processed picture is known, and a second MVF mvf(0,3) of the to-be-processed picture is unknown, scaling process may be performed on the first MVF mvf(2,3) of the to-be-processed picture to obtain the second MVF mvf(0,3) of the to-be-processed picture, where $$mvf(0, 3) = mvf(2, 3) \times \frac{3-0}{3-1} = 3 \times mvf(2, 3).$$

It should be understood that, mvf(0,3) may also be obtained using another known first MVF, for example, mvf(1,2), where $$mvf(0, 3) = mvf(1, 2) \times \frac{3-0}{2-1} = 3 \times mvf(1, 2).$$

Correspondingly, determining a prediction residual of the target sub picture block from the MCP reference pictures according to the second MVFs and based on an MCP algorithm further includes determining P×M MCP signals of the target sub picture block from corresponding MCP reference pictures according to each of the P×M second MVFs, obtaining P×M residual signals of the target sub picture block according to the P×M MCP signals and the picture signal of the target sub picture block, and selecting, from the P×M residual signals, a residual signal with lowest energy as the prediction residual of the target sub picture block.

In another embodiment of the present application, when the first MVF set includes an MVF of each of N pictures relative to an MVF reference picture thereof, where N is an integer greater than or equal to 1, a total quantity of MVF reference pictures of the N pictures is P, the first MVF set includes P first MVFs, and P is an integer greater than or equal to P, obtaining the second MVFs according to the first MVF set and based on a preset vector operation method includes determining an optimal MVF from the P first MVFs, where the optimal MVF is a first MVF that makes energy of the prediction residual of the target sub picture block lowest in the P first MVFs, and determining a third relative picture sequence number when the optimal MVF is an MVF of an $E^{th}$ picture in the N pictures relative to a $G^{th}$ MVF reference picture in F MVF reference pictures of the $E^{th}$ picture, where E is an integer greater than or equal to 1 but less than or equal to N, F is an integer greater than or equal to 1, and G is an integer greater than or equal to 1 but less than or equal to F, where the third relative picture sequence number is a picture sequence number of the $E^{th}$ picture relative to the $G^{th}$ MVF reference picture in the F MVF reference pictures of the $E^{th}$ picture, determining M second relative picture sequence numbers, where each of the M second relative picture sequence numbers is a picture sequence number of the to-be-processed picture relative to each of the M MCP reference pictures, and performing, according to a ratio of the third relative picture sequence number to each of the M second relative picture sequence numbers, scaling process on the MVF of the $E^{th}$ picture relative to the $G^{th}$ MVF reference picture in the F MVF reference pictures of the $E^{th}$ picture to obtain the M second MVFs.

Correspondingly, determining a prediction residual of the target sub picture block from the MCP reference pictures according to the second MVFs and based on an MCP algorithm includes obtaining M MCP signals of the target sub picture block according to each of the M second MVFs and a corresponding MCP reference picture, obtaining M residual signals of the target sub picture block according to the M MCP signals and the picture signal of the target sub picture block, and selecting, from the M residual signals, a residual signal with lowest energy as the prediction residual of the target sub picture block.

It should be noted that, in this embodiment of the present application, scaling process is performed on the first MVF to obtain the second MVF.

In still another embodiment of the present application, the first MVF set includes a first MVF $mvf(t_1,t)$ of the to-be-processed picture relative to a first picture, a first MVF $mvf(t_2,t_1)$ of the first picture relative to a second picture, a first MVF $mvf(t_3,t_2)$ of the second picture relative to a third picture, ..., a first MVF $mvf(t',t_k)$ of a $K^{th}$ picture relative to an MCP reference picture of the to-be-processed picture, where K is an integer greater than or equal to 3, and the obtaining second MVFs according to the first MVF set and based on a preset vector operation method includes obtaining the second MVF $mvf(t',t)$ according to a formula $mvf(t',t)=mvf(t',t_k)+ \ldots +mvf(t_3,t_2)+mvf(t_2,t_1)+mvf(t_1,t)$.

It should be noted that, in this embodiment of the present application, the second MVF is obtained by concatenating multiple first MVFs. Assuming that the to-be-processed picture is a picture 1, and an MCP reference picture of the picture 1 is a picture 3, and a first MVF of the picture 1 in the video frame sequence relative to a picture 2 (an MVF reference picture of the picture 1) is mvf(2,1), and a first MVF of the picture 2 relative to the picture 3 (an MVF reference picture of the picture 2) is mvf(3,2) concatenation process may be performed on mvf(2,1) and mvf(3,2) to obtain a second MVF mvf(3,1) of the picture 1 relative to the picture 3. Further, mvf(3,1)=mvf(3,2)+mvf(2,1). As can be known, during a concatenation operation, an MVF reference picture of a previous MVF (for example, mvf(2,1)) is a picture that is located in the video frame sequence and included in a next MVF (for example, mvf(3,2)). Further, in the foregoing example, assuming that the to-be-processed picture is the picture 1, and the MCP reference picture of the picture 1 is the picture 3, and the first MVF of the picture 1 in the video frame sequence relative to the picture 2 (an MVF reference picture of the picture 1) is mvf(2,1), and a first MVF of the picture 2 relative to a picture 4 (an MVF reference picture of the picture 2) is mvf(4,2), to obtain the second MVF mvf(3,1) of the picture 1 relative to the picture 3, scaling process needs to be first performed on mvf(4,2) to obtain mvf(3,2) where $$mvf(3, 2) = mvf(4, 2) \times \frac{2-4}{2-3} = 2 \times mvf(4, 2),$$

and then concatenation process is performed on mvf(2,1) and mvf(3,2) to obtain mvf(3,1). Further, mvf(3,1)=mvf(3,2)+mvf(2,1).

As can be known, in the technical solution provided by this embodiment of the present application, first, a first MVF set is obtained, where the first MVF set includes an MVF of each of at least one picture relative to an MVF reference picture thereof. Then a second MVF is obtained according to the first MVF set and based on a preset vector operation method, where the second MVF is an MVF of a target sub picture block in a to-be-processed picture relative to each of M MCP reference pictures of the to-be-processed picture. Then an MCP signal of the target sub picture block is determined from the M MCP reference pictures according to the second MVF and based on an MCP algorithm, a prediction residual of the target sub picture block is obtained according to a picture signal of the target sub picture block and the MCP signal of the target sub picture block, and then coding process is performed on the prediction residual of the target sub picture block to obtain a coded signal of the prediction residual of the target sub picture block. In this solution, a quantity of MCP reference pictures is M, and M is an integer greater than or equal to 2. That is, in comparison with the other approaches, the technical solution provided by this embodiment of the present application supports MCP using multiple reference frames. In comparison with MCP using a single reference frame in the other approaches, in most cases, a prediction residual of a target sub picture block that is finally determined using this solution is less than a prediction residual of a target sub picture block when a single reference frame is used in the other approaches. Therefore, in most cases, coding efficiency of a target sub picture block is improved.

Embodiment 2

Figure 2A:
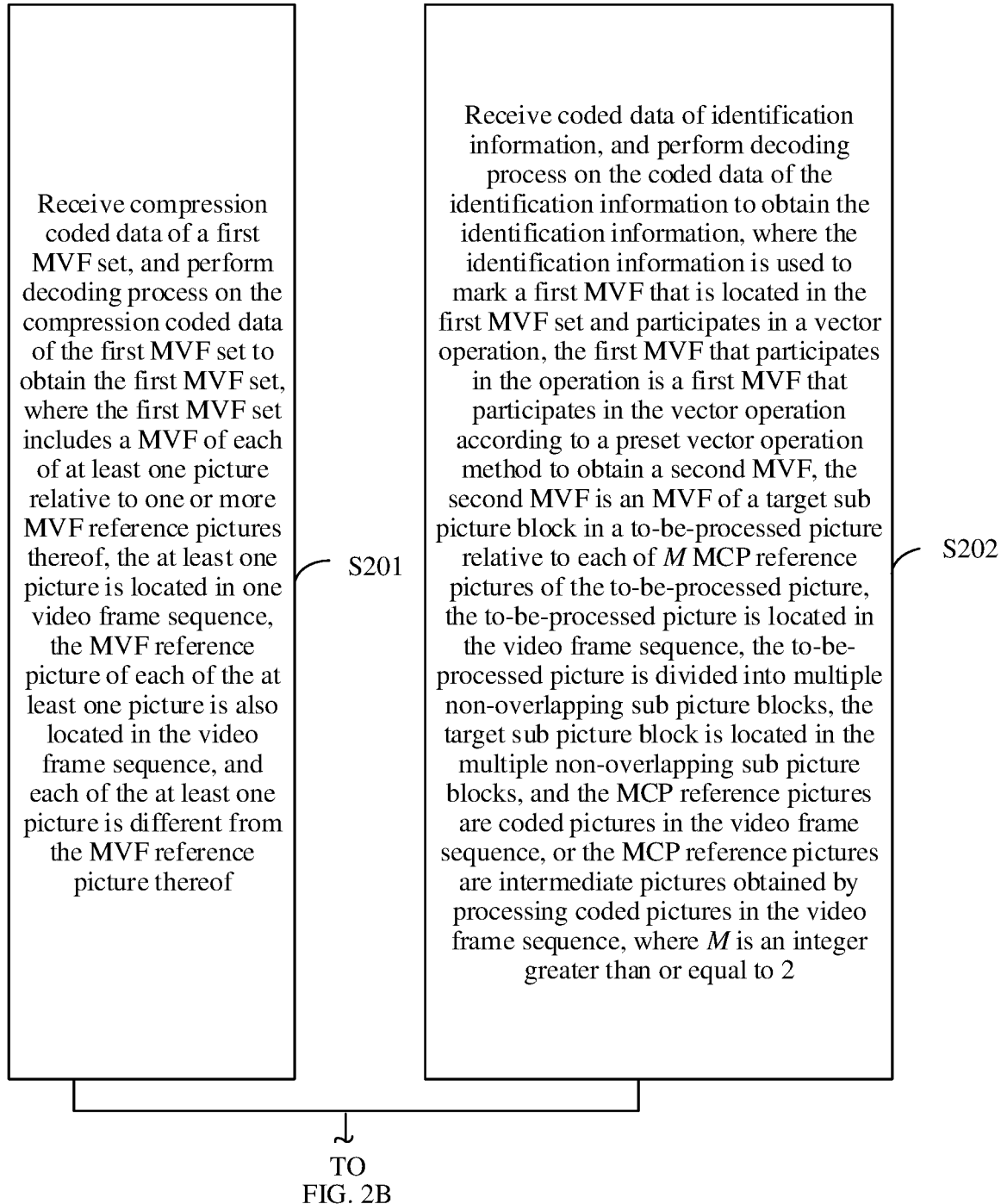
FIG. 2A and FIG. 2B are a schematic flowchart of a video decoding method according to an embodiment of the present application.
Figure 2B:
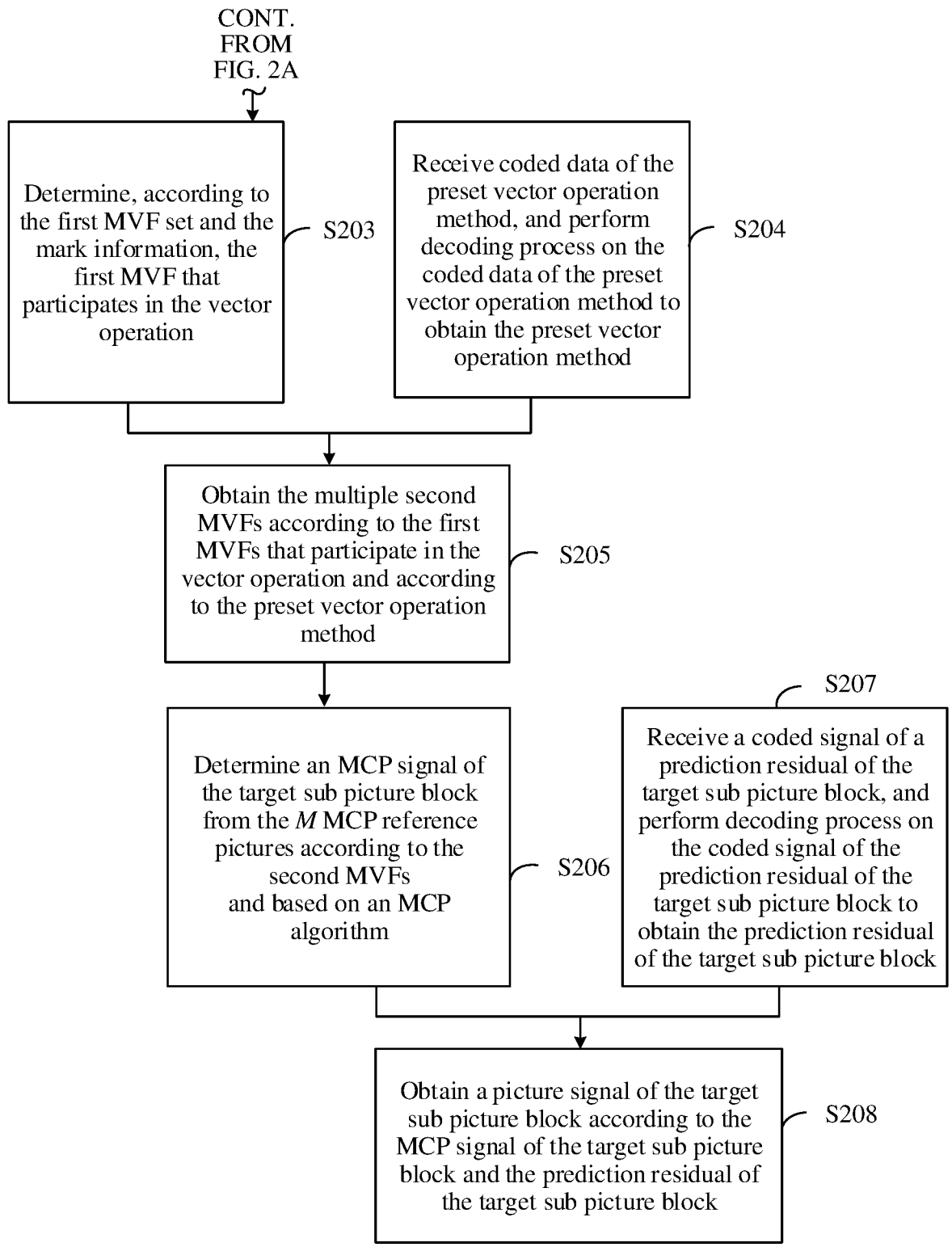

Referring to FIG. 2A and FIG. 2B, FIG. 2A and FIG. 2B are a schematic flowchart of a video decoding method according to this embodiment of the present application. The video decoding method is applied to a decoder. The video decoding method provided by this embodiment of the present application corresponds to the video coding method provided by Embodiment 1. Further, the video decoding method provided by this embodiment of the present application includes the following steps.

Step S201: Receive compression coded data of a first MVF set, and perform decoding process on the compression coded data of the first MVF set to obtain the first MVF set, where the first MVF set includes an MVF of each of at least one picture relative to one or more MVF reference pictures thereof, the at least one picture is located in one video frame sequence, the MVF reference picture of each of the at least one picture is also located in the video frame sequence, and each of the at least one picture is different from the MVF reference picture thereof.

Step S202: Receive coded data of identification information, and perform decoding process on the coded data of the identification information to obtain the identification information, where the identification information is used to mark a first MVF that is located in the first MVF set and participates in a vector operation, the first MVF that participates in the operation is a first MVF that participates in the vector operation according to a preset vector operation method to obtain a second MVF, the second MVF is an MVF of a target sub picture block in a to-be-processed picture relative to each of M MCP reference pictures of the to-be-processed picture, the to-be-processed picture is located in the video frame sequence, the to-be-processed picture is divided into multiple non-overlapping sub picture blocks, the target sub picture block is located in the multiple non-overlapping sub picture blocks, and the MCP reference pictures are coded pictures in the video frame sequence, or the MCP reference pictures are intermediate pictures obtained by processing coded pictures in the video frame sequence, where M is an integer greater than or equal to 2.

Generally, the first MVF that participates in the operation is a proper subset of the first MVF set.

Step S203: Determine, according to the first MVF set and the mark information, the first MVF that participates in the vector operation.

Step S204: Receive coded data of the preset vector operation method, and perform decoding process on the coded data of the preset vector operation method to obtain the preset vector operation method.

It should be noted that, the to-be-processed picture may be located in the at least one picture, or may not be located in the at least one picture. For different cases, the preset vector operation method also varies. When the at least one picture includes the to-be-processed picture, a quantity of MVF reference pictures of the to-be-processed picture is less than or equal to M, that is, the quantity of MVF reference pictures of the to-be-processed picture is less than the quantity of MCP reference pictures of the to-be-processed picture.

Step S205: Obtain the multiple second MVFs according to the first MVFs that participate in the vector operation and according to the preset vector operation method.

Step S206: Determine an MCP signal of the target sub picture block from the M MCP reference pictures according to the second MVFs and based on an MCP algorithm.

Step S207: Receive a coded signal of a prediction residual of the target sub picture block, and perform decoding process on the coded signal of the prediction residual of the target sub picture block to obtain the prediction residual of the target sub picture block.

Step S208: Obtain a picture signal of the target sub picture block according to the MCP signal of the target sub picture block and the prediction residual of the target sub picture block.

It should be noted that, for determining the MCP signal of the target sub picture block from the M MCP reference pictures in step S206, a person skilled in the art should understand that M MCP signals can be determined from the M MCP reference pictures, where the MCP signal of the target sub picture block is one of the M MCP signals, and in comparison with other signals in the M MCP signals than the MCP signal of the target sub picture block, the MCP signal of the target sub picture block minimizes the generated prediction residual.

It should be noted that, obtaining the picture signal of the target sub picture block according to the MCP signal of the target sub picture block and the prediction residual of the target sub picture block in step S208 includes the following content of adding a pixel value of a corresponding pixel in the prediction residual of the target sub picture block to a pixel value of each pixel included in the MCP signal of the target sub picture block to obtain the picture signal of the target sub picture block, where the MCP signal of the target sub picture block includes multiple pixels, the prediction residual of the target sub picture block also includes multiple pixels, and for each pixel included in the MCP signal of the target sub picture block, the corresponding pixel exists in the prediction residual of the target sub picture block.

In an embodiment of the present application, when the first MVFs that participate in the vector operation include an MVF of each of N pictures relative to an MVF reference picture thereof, where a total quantity of MVF reference pictures of the N pictures is P, N is an integer greater than or equal to 1, and P is an integer greater than or equal to N, obtaining the second MVFs according to the first MVFs that participate in the vector operation and according to the preset vector operation method in step S205 includes determining P first relative picture sequence numbers, where each of the P first relative picture sequence numbers is a picture sequence number of each of the N pictures relative to each of MVF reference pictures thereof, determining M second relative picture sequence numbers, where each of the M second relative picture sequence numbers is a picture sequence number of the to-be-processed picture relative to each of the M MCP reference pictures, obtaining P×M scaling ratios, where each of the P×M scaling ratios is a ratio of each of the P first relative picture sequence numbers to each of the M second relative picture sequence numbers, and performing processing according to the following operation method for a $Q^{th}$ scaling ratio for each of the P×M scaling ratios, where when a first relative picture sequence number corresponding to the $Q^{th}$ scaling ratio is a picture sequence number of a $U^{th}$ picture in the N pictures relative to a $V^{th}$ MVF reference picture of the $U^{th}$ picture, scaling process is performed on an MVF of the $U^{th}$ picture relative to the $V^{th}$ MVF reference picture of the $U^{th}$ picture according to a $Q^{th}$ scaling ratio to obtain the $Q^{th}$ second MVF.

It should be noted that, in this embodiment of the present application, scaling process is performed on the first MVF to obtain the second MVF. For example, scaling process may be performed on a known MVF $mvf(t_1',t_1)$ to obtain a second MVF $mvf(t',t)$, further, $$mvf(t', t) = mvf(t_1', t_1) \times \frac{t-t'}{t_1 - t_1'},$$

where t indicates a moment of the to-be-processed picture, t' indicates a moment of the MCP reference picture of the to-be-processed picture, $t_1$ indicates a moment of a picture located in the video frame sequence, $t_1'$ indicates a moment of an MVF reference picture of the picture located in the video frame sequence, and when $t_1=t$, $mvf(t_1',t_1)$ indicates a first MVF of the to-be-processed picture.

Correspondingly, determining an MCP signal of the target sub picture block from the M MCP reference pictures according to the second MVFs and based on an MCP algorithm in step S206 further includes determining P×M MCP signals of the target sub picture block from corresponding MCP reference pictures according to each of the P×M second MVFs, and obtaining the picture signal of the target sub picture block according to the MCP signal of the target sub picture block and the prediction residual of the target sub picture block in step S208 includes obtaining P×M predictive picture signals of the target sub picture block according to the P×M MCP signals and residual signals of the target sub picture block, and selecting, from the P×M predictive picture signals, a predictive picture signal with lowest energy as the picture signal of the target sub picture block.

In another embodiment of the present application, when the first MVF set includes an MVF of each of N pictures relative to an MVF reference picture thereof, where N is an integer greater than or equal to 1, a total quantity of MVF reference pictures of the N pictures is P, the first MVF set includes P first MVFs, and P is an integer greater than or equal to N, obtaining the second MVFs according to the first MVFs that participate in the vector operation and according to the preset vector operation method in step S205 includes determining an optimal MVF from the P first MVFs, where the optimal MVF is a first MVF that makes energy of the prediction residual of the target sub picture block lowest in the P first MVFs, and when the optimal MVF is an MVF of an $E^{th}$ picture in the N pictures relative to a $G^{th}$ MVF reference picture in F MVF reference pictures of the $E^{th}$ picture, where E is an integer greater than or equal to 1 but less than or equal to N, F is an integer greater than or equal to 1, and G is an integer greater than or equal to 1 but less than or equal to F, determining a third relative picture sequence number, where the third relative picture sequence number is a picture sequence number of the $E^{th}$ picture relative to the $G^{th}$ MVF reference picture in the F MVF reference pictures of the $E^{th}$ picture, determining M second relative picture sequence numbers, where each of the M second relative picture sequence numbers is a picture sequence number of the to-be-processed picture relative to each of the M MCP reference pictures, and performing, according to a ratio of the third relative picture sequence number to each of the M second relative picture sequence numbers, scaling process on the MVF of the $E^{th}$ picture relative to the $G^{th}$ MVF reference picture in the F MVF reference pictures of the $E^{th}$ picture to obtain the M second MVFs.

Correspondingly, determining an MCP signal of the target sub picture block from the M MCP reference pictures according to the second MVFs and based on an MCP algorithm in step S206 includes obtaining M MCP signals of the target sub picture block according to each of the M second MVFs and a corresponding MCP reference picture, and obtaining the picture signal of the target sub picture block according to the MCP signal of the target sub picture block and the prediction residual of the target sub picture block in step S208 includes obtaining M predictive picture signals of the target sub picture block according to the M MCP signals of the target sub picture block and the prediction residual of the target sub picture block, and selecting, from the M predictive picture signals, a predictive picture signal with lowest energy as the picture signal of the target sub picture block.

It should be noted that, in this embodiment of the present application, scaling process is performed on the first MVF to obtain the second MVF.

In still another embodiment of the present application, the first MVFs that participate in the vector operation include a first MVF $mvf(t_1,t)$ of the to-be-processed picture relative to a first picture, a first MVF $mvf(t_2,t_1)$ of the first picture relative to a second picture, a first MVF $mvf(t_3,t_2)$ of the second picture relative to a third picture, . . . , a first MVF $mvf(t',t_k)$ of a $K^{th}$ picture relative to an MCP reference picture of the to-be-processed picture, where K is an integer greater than or equal to 3, and obtaining the second MVFs according to the first MVFs that participate in the vector operation and according to the preset vector operation method in step S205 includes obtaining the second MVF $mvf(t',t)$ according to a formula $mvf(t',t_k)=mvf(t_3t_2)+ \ldots + mvf(t_2,t_1)+mvf(t_1,t)+mvf(t',t)$.

It should be noted that, in this embodiment of the present application, the second MVF is obtained by concatenating multiple first MVFs. Assuming that the to-be-processed picture is a picture 1, and an MCP reference picture of the picture 1 is a picture 3, and a first MVF of the picture 1 in the video frame sequence relative to a picture 2 (an MVF reference picture of the picture 1) is mvf(2,1) and a first MVF of the picture 2 relative to the picture 3 (an MVF reference picture of the picture 2) is mvf(3,2), concatenation process may be performed on mvf(2,1) and mvf(3,2) to obtain a second MVF mvf(3,1) of the picture 1 relative to the picture 3. Further, mvf(3,1)=mvf(3,2)+mvf(2,1). As can be known, during a concatenation operation, an MVF reference picture of a previous MVF (for example, mvf(2,1)) is a picture that is located in the video frame sequence and included in a next MVF (for example, mvf(3,2)). Further, in the foregoing example, assuming that the to-be-processed picture is the picture 1, and the MCP reference picture of the picture 1 is the picture 3, and the first MVF of the picture 1 in the video frame sequence relative to the picture 2 (an MVF reference picture of the picture 1) is mvf(2,1), and a first MVF of the picture 2 relative to a picture 4 (an MVF reference picture of the picture 2) is mvf(4,2), to obtain the second MVF mvf(3,1) of the picture 1 relative to the picture 3, scaling process needs to be first performed on mvf(4,2) to obtain mvf(3,2), where $$mvf(3, 2) = mvf(4, 2) \times \frac{2-4}{2-3} = 2 \times mvf(4, 2),$$

and then concatenation process is performed on mvf(2,1) and mvf(3,2) to obtain mvf(3,1), where mvf(3,1)=mvf(3,2)+mvf(2,1).

As can be known, the technical solution provided by this embodiment of the present application includes determining an MCP signal of a target sub picture block from M MCP reference pictures according to a second MVF and based on an MCP algorithm, receiving a coded signal of a prediction residual of the target sub picture block, and performing decoding process on the coded signal of the prediction residual of the target sub picture block to obtain the prediction residual of the target sub picture block, and obtaining a picture signal of the target sub picture block according to the MCP signal of the target sub picture block and the prediction residual of the target sub picture block. In this solution, a quantity of MCP reference pictures is M, and M is an integer greater than or equal to 2. That is, in comparison with the other approaches, the technical solution provided by this embodiment of the present application supports MCP using multiple reference frames. In comparison with MCP using a single reference frame in the other approaches, in most cases, a prediction residual of a target sub picture block that is finally determined using this solution is less than a prediction residual of a target sub picture block when a single reference frame is used in the other approaches. Therefore, in most cases, coding efficiency of a target sub picture block is improved.

Embodiment 3

Figure 3A:
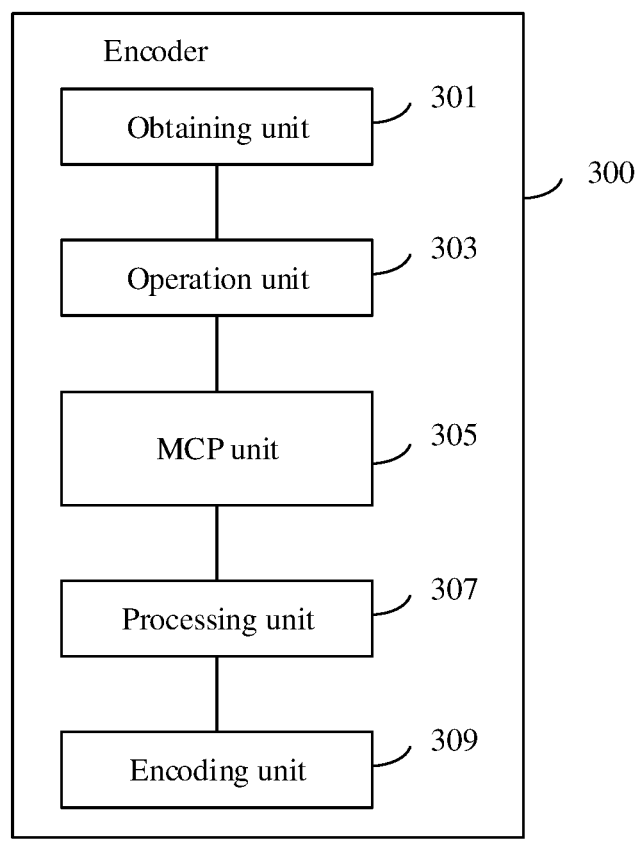
FIG. 3A is a schematic structural diagram of an encoder according to an embodiment of the present application.

Referring to FIG. 3A, this embodiment of the present application further provides an encoder 300. The encoder 300 is an entity that performs the video coding method in Embodiment 1. Further, the encoder 300 includes an obtaining unit 301, an operation unit 303, an MCP unit 305, a processing unit 307, and an encoding unit 309.

The obtaining unit 301 is configured to obtain a first MVF set, where the first MVF set includes an MVF of each of at least one picture relative to one or more MVF reference pictures thereof, the at least one picture is located in one video frame sequence, the MVF reference picture of each of the at least one picture is also located in the video frame sequence, and each of the at least one picture is different from the MVF reference picture thereof.

The operation unit 303 is configured to obtain multiple second MVFs according to the first MVF set and based on a preset vector operation method, where each of the multiple second MVFs is an MVF of a target sub picture block in a to-be-processed picture relative to each of M MCP reference pictures of the to-be-processed picture, the to-be-processed picture is located in the video frame sequence, the to-be-processed picture is divided into multiple non-overlapping sub picture blocks, the target sub picture block is located in the multiple non-overlapping sub picture blocks, and the MCP reference pictures are coded pictures in the video frame sequence, or the MCP reference pictures are intermediate pictures obtained by processing coded pictures in the video frame sequence, where M is an integer greater than or equal to 2.

It should be noted that, an MVF may have different granularities. For example, if each pixel is used as a basic unit indicated by a motion vector, a granularity of the MVF is marked with 1×1, and if each set of 2×2 pixels is used as a basic unit indicated by a motion vector, a granularity of the MVF is marked with 2×2. In the technical solution provided by this embodiment of the present application, the 1×1 granularity is used as an example for description.

It should be noted that, the to-be-processed picture may be located in the at least one picture, or may not be located in the at least one picture. For different cases, the preset vector operation method also varies. When the at least one picture includes the to-be-processed picture, a quantity of MVF reference pictures of the to-be-processed picture is less than or equal to M, that is, the quantity of MVF reference pictures of the to-be-processed picture is less than the quantity of MCP reference pictures of the to-be-processed picture.

The MCP unit 305 is configured to determine an MCP signal of the target sub picture block from the M MCP reference pictures according to the second MVFs and based on an MCP algorithm.

The processing unit 307 is configured to obtain a prediction residual of the target sub picture block according to a picture signal of the target sub picture block and the MCP signal of the target sub picture block.

The processing unit 307 is further configured to subtract a pixel value of a corresponding pixel in the MCP signal of the target sub picture block from a pixel value of each pixel included in the picture signal of the target sub picture block to obtain the prediction residual of the target sub picture block, where the picture signal of the target sub picture block includes multiple pixels, the MCP signal of the target sub picture block also includes multiple pixels, and for each pixel included in the picture signal of the target sub picture block, the corresponding pixel exists in the MCP signal of the target sub picture block.

The encoding unit 309 is configured to perform coding process on the prediction residual of the target sub picture block to obtain a coded signal of the prediction residual of the target sub picture block, and send the coded signal of the prediction residual of the target sub picture block to a peer decoder.

Figure 3B:
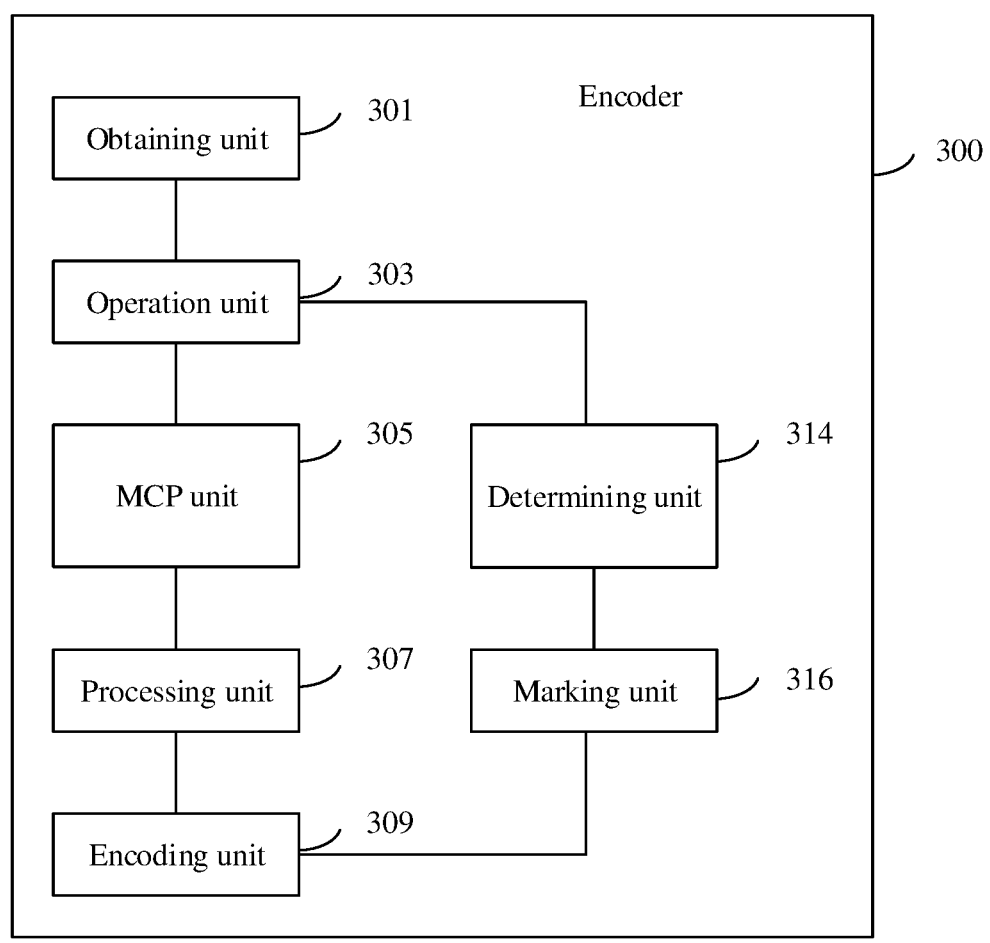
FIG. 3B is a schematic structural diagram of another encoder according to an embodiment of the present application.

Further, referring to FIG. 3B, the encoder 300 further includes a determining unit 314 and a marking unit 316.

After the multiple second MVFs are obtained according to the first MVF set and based on the preset vector operation method, the determining unit 314 is configured to determine a first MVF that is located in the first MVF set and participates in an operation, where the first MVF that participates in the operation is a first MVF that participates in the preset vector operation method to obtain the second MVF.

Generally, the first MVF that participates in the operation is a proper subset of the first MVF set.

The marking unit 316 is configured to mark the first MVF that is located in the first MVF set and participates in the operation to obtain identification information used to mark the first MVF that participates in the operation.

It should be noted that, when the first MVF that participates in the operation includes a first MVF of the to-be-processed picture, and selection of an MVF reference picture of the to-be-processed picture and an MCP reference picture of the to-be-processed picture meets a specific relationship, performing coding process on the first MVF of the to-be-processed picture herein may be implemented in the manner of performing joint coding on indication information of the MVF reference picture of the to-be-processed picture and the MCP reference picture of the to-be-processed picture. For example, the MVF reference picture of the to-be-processed picture is a picture closest to the to-be-processed picture, among the MCP reference pictures of the to-be-processed picture. In this case, only an index value needs to be coded to indicate a location of the MVF reference picture of the to-be-processed picture, among the MCP reference pictures of the to-be-processed picture. If the selection of the MVF reference picture of the to-be-processed picture meets a certain rule, for example, is one frame or two frames before the to-be-processed picture, the mode is coded before the video sequence is coded. A most flexible manner is to mark, on the to-be-processed picture, the location of the MVF reference picture of the to-be-processed picture. The location is generally indicated by a distance between the MVF reference picture and the to-be-processed picture, for example, indicated by ΔPOC in the HEVC standard.

In FIG. 3B, the encoding unit 309 is further configured to perform coding process on the identification information to obtain coded data of the identification information, and send the coded data of the identification information to the decoder.

Further, referring to FIG. 3A, it should be noted that, the encoding unit 309 is configured to perform coding process on the preset vector operation method to obtain coded data of the preset vector operation method, and send the coded data of the preset vector operation method to the decoder.

In an embodiment of the present application, after the obtaining unit 301 obtains the first MVF set, and before the operation unit 303 obtains the multiple second MVFs by performing an operation, the encoding unit 309 is further configured to perform lossy compression coding process on the first MVF set to obtain lossy compression coded data of the first MVF set.

The operation unit 303 is further configured to perform decoding process on the lossy compression coded data of the first MVF set to obtain a third MVF set, and obtain the multiple second MVFs according to the third MVF set, a picture sequence number of each of the at least one picture, and a picture sequence number of the MVF reference picture thereof, and based on the preset vector operation method.

The encoding unit 309 is further configured to transmit the lossy compression coded data of the first MVF set to the decoder.

In another embodiment of the present application, after the obtaining unit 301 obtains the first MVF set, and before the operation unit 303 obtains the multiple second MVFs by performing an operation, the encoding unit 309 is further configured to perform lossless compression coding process on the first MVF set to obtain lossless compression coded data of the first MVF set.

Correspondingly, the operation unit 303 is further configured to perform decoding process on the lossless compression coded data of the first MVF set to obtain the first MVF set, and obtain the multiple second MVFs according to the first MVF set, a picture sequence number of each of the at least one picture, and a picture sequence number of the MVF reference picture thereof, and based on the preset vector operation method.

The encoding unit 309 is further configured to transmit the lossless compression coded data of the first MVF set to the decoder.

In still another embodiment of the present application, when the first MVF set includes an MVF of each of N pictures relative to an MVF reference picture thereof, where N is an integer greater than or equal to 1, a total quantity of MVF reference pictures of the N pictures is P, and P is an integer greater than or equal to N, the operation unit 303 is further configured to determine P first relative picture sequence numbers, where each of the P first relative picture sequence numbers is a picture sequence number of each of the N pictures relative to each of MVF reference pictures thereof, determine M second relative picture sequence numbers, where each of the M second relative picture sequence numbers is a picture sequence number of the to-be-processed picture relative to each of the M MCP reference pictures, obtain P×M scaling ratios, where each of the P×M scaling ratios is a ratio of each of the P first relative picture sequence numbers to each of the M second relative picture sequence numbers, and perform processing according to the following operation method for a $Q^{th}$ scaling ratio for each of the P×M scaling ratios in order to obtain the P×M second MVFs, where when a first relative picture sequence number corresponding to the $Q^{th}$ scaling ratio is a picture sequence number of a $U^{th}$ picture in the N pictures relative to a $V^{th}$ MVF reference picture of the $U^{th}$ picture, scaling process is performed on an MVF of the $U^{th}$ picture relative to the $V^{th}$ MVF reference picture of the $U^{th}$ picture according to a $Q^{th}$ scaling ratio to obtain the $Q^{th}$ second MVF.

It should be noted that, in this embodiment of the present application, scaling process is performed on the first MVF to obtain the second MVF. For example, scaling process may be performed on a known MVF $mvf(t_1',t_1)$ to obtain a second MVF $mvf(t',t)$, further, $$mvf(t', t) = mvf(t_1', t_1) \times \frac{t - t'}{t_1 - t_1'},$$

where t indicates a moment of the to-be-processed picture, t' indicates a moment of the MCP reference picture of the to-be-processed picture, $t_1$ indicates a moment of a picture located in the video frame sequence, $t_1'$ indicates a moment of an MVF reference picture of the picture located in the video frame sequence, and when $t_1=t$, $mvf(t_1',t_1)$ indicates a first MVF of the to-be-processed picture.

Referring to FIG. 1C, assuming that the to-be-processed picture is a picture whose POC is 3, and the MCP reference picture of the to-be-processed picture is a picture whose POC is 0, and the MVF reference picture of the to-be-processed picture is a picture whose POC is 2, where a first MVF mvf(2,3) of the to-be-processed picture is known, and a second MVF mvf(0,3) of the to-be-processed picture is unknown, scaling process may be performed on the first MVF mvf(2,3) of the to-be-processed picture to obtain the second MVF mvf(0,3) of the to-be-processed picture, where $$mvf(0, 3) = mvf(2, 3) \times \frac{3 - 0}{3 - 1} = 3 \times mvf(2, 3).$$

It should be understood that, mvf(0,3) may also be obtained using another known first MVF, for example, mvf(1,2), where $$mvf(0, 3) = mvf(1, 2) \times \frac{3-0}{2-1} = 3 \times mvf(1, 2).$$

Correspondingly, the MCP unit 305 is further configured to determine P×M MCP signals of the target sub picture block from corresponding MCP reference pictures according to each of the P×M second MVFs and based on the MCP algorithm, obtain P×M residual signals of the target sub picture block according to the picture signal of the target sub picture block and each of the P×M MCP signals of the target sub picture block, and select, from the P×M residual signals, a residual signal with lowest energy as the prediction residual of the target sub picture block.

In still another embodiment of the present application, when the first MVF set includes an MVF of each of N pictures relative to an MVF reference picture thereof, where N is an integer greater than or equal to 1, a total quantity of MVF reference pictures of the N pictures is P, the first MVF set includes P first MVFs, and P is an integer greater than or equal to N, the operation unit 303 is further configured to determine an optimal MVF from the P first MVFs, where the optimal MVF is a first MVF that makes energy of the prediction residual of the target sub picture block lowest in the P first MVFs, and determine a third relative picture sequence number when the optimal MVF is an MVF of an $E^{th}$ picture in the N pictures relative to a $G^{th}$ MVF reference picture in F MVF reference pictures of the $E^{th}$ picture, where E is an integer greater than or equal to 1 but less than or equal to N, F is an integer greater than or equal to 1, and G is an integer greater than or equal to 1 but less than or equal to F, where the third relative picture sequence number is a picture sequence number of the $E^{th}$ picture relative to the $G^{th}$ MVF reference picture in the F MVF reference pictures of the $E^{th}$ picture, determine M second relative picture sequence numbers, where each of the M second relative picture sequence numbers is a picture sequence number of the to-be-processed picture relative to each of the M MCP reference pictures, and perform, according to a ratio of the third relative picture sequence number to each of the M second relative picture sequence numbers, scaling process on the MVF of the $E^{th}$ picture relative to the $G^{th}$ MVF reference picture in the F MVF reference pictures of the $E^{th}$ picture to obtain the M second MVFs.

Correspondingly, the MCP unit 305 is further configured to determine M MCP signals of the target sub picture block according to each of the M second MVFs and a corresponding MCP reference picture and based on the MCP algorithm, determine M residual signals of the target sub picture block according to the picture signal of the target sub picture block and the M MCP signals of the target sub picture block, and select, from the M residual signals, a residual signal with lowest energy as the prediction residual of the target sub picture block.

It should be noted that, in this embodiment of the present application, scaling process is performed on the first MVF to obtain the second MVF.

In still another embodiment of the present application, the first MVF set includes a first MVF $mvf(t_1,t)$ of the to-be-processed picture relative to a first picture, a first MVF $mvf(t_2,t_1)$ of the first picture relative to a second picture, a first MVF $mvf(t_3,t_2)$ of the second picture relative to a third picture, . . . , a first MVF $mvf(t',t_k)$ of a $K^{th}$ picture relative to an MCP reference picture of the to-be-processed picture, where K is an integer greater than or equal to 3, and the operation unit 303 is further configured to obtain the second MVF mvf(t',t) according to a formula mvf(t',t)=mvf(t',$t_k$)+ . . . +mvf($t_3,t_2$)+mvf($t_2,t_1$)+mvf($t_1$,t).

It should be noted that, in this embodiment of the present application, the second MVF is obtained by concatenating multiple first MVFs. Assuming that the to-be-processed picture is a picture 1, and an MCP reference picture of the picture 1 is a picture 3, and a first MVF of the picture 1 in the video frame sequence relative to a picture 2 (an MVF reference picture of the picture 1) is mvf(2,1) and a first MVF of the picture 2 relative to the picture 3 (an MVF reference picture of the picture 2) is mvf(3,2) concatenation process may be performed on mvf(2,1) and mvf(3,2) to obtain a second MVF mvf(3,1) of the picture 1 relative to the picture 3. Further, mvf(3,1)=mvf(3,2)+mvf(2,1). As can be known, during a concatenation operation, an MVF reference picture of a previous MVF (for example, mvf(2,1)) is a picture that is located in the video frame sequence and included in a next MVF (for example, mvf(3,2)). Further, in the foregoing example, assuming that the to-be-processed picture is the picture 1, and the MCP reference picture of the picture 1 is the picture 3, and the first MVF of the picture 1 in the video frame sequence relative to the picture 2 (an MVF reference picture of the picture 1) is mvf(2,1), and a first MVF of the picture 2 relative to a picture 4 (an MVF reference picture of the picture 2) is mvf(4,2) to obtain the second MVF mvf(3,1) of the picture 1 relative to the picture 3, scaling process needs to be first performed on mvf(4,2) to obtain mvf(3,2) where $$mvf(3, 2) = mvf(4, 2) \times \frac{2-4}{2-3} = 2 \times mvf(4, 2),$$

and then concatenation process is performed on mvf(2,1) and mvf(3,2) to obtain mvf(3,1) where mvf(3,1)=mvf(3,2)+mvf(2,1).

As can be known, in the technical solution provided by this embodiment of the present application, the obtaining unit 301 is configured to obtain a first MVF set, where the first MVF set includes an MVF of each of at least one picture relative to an MVF reference picture thereof. The operation unit 303 is configured to obtain a second MVF according to the first MVF set and based on a preset vector operation method, where the second MVF is an MVF of a target sub picture block in a to-be-processed picture relative to each of M MCP reference pictures of the to-be-processed picture. The MCP unit 305 is configured to determine an MCP signal of the target sub picture block from the M MCP reference pictures according to the second MVF and based on an MCP algorithm. The processing unit 307 is configured to obtain a prediction residual of the target sub picture block according to a picture signal of the target sub picture block and the MCP signal of the target sub picture block, and the encoding unit 309 is configured to perform coding process on the prediction residual of the target sub picture block to obtain a coded signal of the prediction residual of the target sub picture block. In this solution, a quantity of MCP reference pictures is M, and M is an integer greater than or equal to 2. That is, in comparison with the other approaches, the technical solution provided by this embodiment of the present application supports MCP using multiple reference frames. In comparison with MCP using a single reference frame in the other approaches, in most cases, a prediction residual of a target sub picture block that is finally determined using this solution is less than a prediction residual of a target sub picture block when a single reference frame is used in the other approaches. Therefore, in most cases, coding efficiency of a target sub picture block is improved.

Embodiment 4

Figure 4:
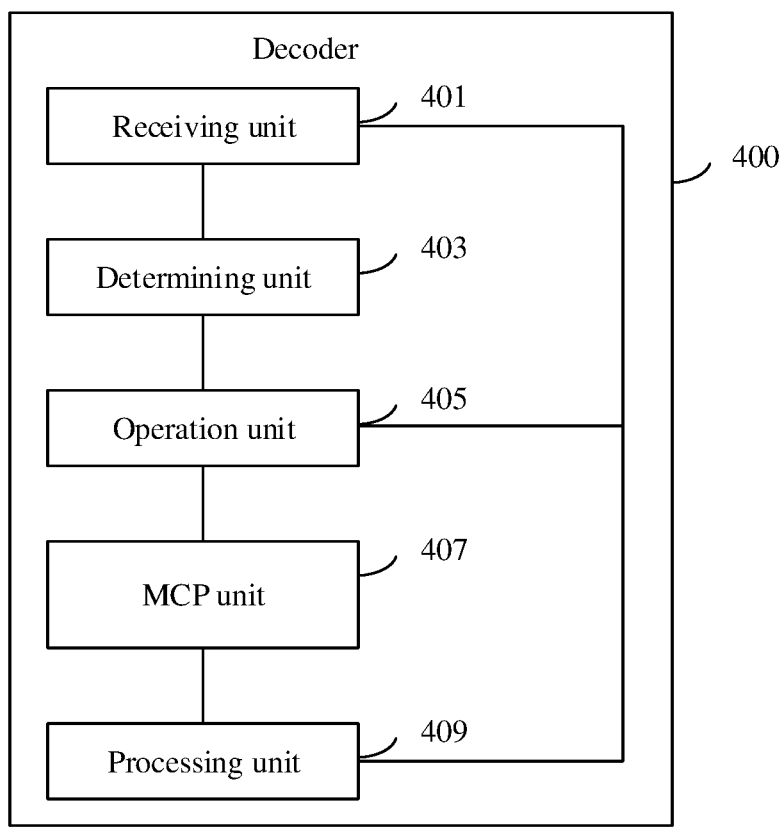
FIG. 4 is a schematic structural diagram of a decoder according to an embodiment of the present application.

Referring to FIG. 4, this embodiment of the present application further provides a decoder 400. The decoder 400 is an entity that performs the video decoding method in Embodiment 2. Further, the decoder 400 includes a receiving unit 401, a determining unit 403, an operation unit 405, an MCP unit 407, and a processing unit 409.

The receiving unit 401 is configured to receive compression coded data of a first MVF set, and perform decoding process on the compression coded data of the first MVF set to obtain the first MVF set, where the first MVF set includes an MVF of each of at least one picture relative to one or more MVF reference pictures thereof, the at least one picture is located in one video frame sequence, the MVF reference picture of each of the at least one picture is also located in the video frame sequence, and each of the at least one picture is different from the MVF reference picture thereof.

The receiving unit 401 is further configured to receive coded data of identification information, and perform decoding process on the coded data of the identification information to obtain the identification information, where the identification information is used to mark a first MVF that is located in the first MVF set and participates in a vector operation, the first MVF that participates in the operation is a first MVF that participates in the vector operation according to a preset vector operation method to obtain a second MVF, the second MVF is an MVF of a target sub picture block in a to-be-processed picture relative to each of M MCP reference pictures of the to-be-processed picture, the to-be-processed picture is located in the video frame sequence, the to-be-processed picture is divided into multiple non-overlapping sub picture blocks, the target sub picture block is located in the multiple non-overlapping sub picture blocks, and the MCP reference pictures are coded pictures in the video frame sequence, or the MCP reference pictures are intermediate pictures obtained by processing coded pictures in the video frame sequence, where M is an integer greater than or equal to 2.

Generally, the first MVF that participates in the operation is a proper subset of the first MVF set.

The determining unit 403 is configured to determine, according to the first MVF set and the mark information, the first MVF that participates in the vector operation.

The receiving unit 401 is further configured to receive coded data of the preset vector operation method, and perform decoding process on the coded data of the preset vector operation method to obtain the preset vector operation method.

It should be noted that, the to-be-processed picture may be located in the at least one picture, or may not be located in the at least one picture. For different cases, the preset vector operation method also varies. When the at least one picture includes the to-be-processed picture, a quantity of MVF reference pictures of the to-be-processed picture is less than or equal to M, that is, the quantity of MVF reference pictures of the to-be-processed picture is less than the quantity of MCP reference pictures of the to-be-processed picture.

The operation unit 405 is configured to obtain the multiple second MVFs according to the first MVFs that participate in the vector operation and according to the preset vector operation method.

The MCP unit 407 is configured to determine an MCP signal of the target sub picture block from the M MCP reference pictures according to the second MVFs and based on an MCP algorithm.

It should be noted that, for determining the MCP signal of the target sub picture block from the M MCP reference pictures, a person skilled in the art should understand that M MCP signals can be determined from the M MCP reference pictures, where the MCP signal of the target sub picture block is one of the M MCP signals, and in comparison with other signals in the M MCP signals than the MCP signal of the target sub picture block, the MCP signal of the target sub picture block minimizes the generated prediction residual.

The receiving unit 401 is further configured to receive a coded signal of a prediction residual of the target sub picture block, and perform decoding process on the coded signal of the prediction residual of the target sub picture block to obtain the prediction residual of the target sub picture block.

The processing unit 409 is configured to obtain a picture signal of the target sub picture block according to the MCP signal of the target sub picture block and the prediction residual of the target sub picture block.

It should be noted that, the processing unit 409 is further configured to add a pixel value of a corresponding pixel in the prediction residual of the target sub picture block to a pixel value of each pixel included in the MCP signal of the target sub picture block to obtain the picture signal of the target sub picture block, where the MCP signal of the target sub picture block includes multiple pixels, the prediction residual of the target sub picture block also includes multiple pixels, and for each pixel included in the MCP signal of the target sub picture block, the corresponding pixel exists in the prediction residual of the target sub picture block.

In an embodiment of the present application, when the first MVFs that participate in the vector operation include an MVF of each of N pictures relative to an MVF reference picture thereof, where a total quantity of MVF reference pictures of the N pictures is P, N is an integer greater than or equal to 1, and P is an integer greater than or equal to N, the operation unit 405 is further configured to determine P first relative picture sequence numbers, where each of the P first relative picture sequence numbers is a picture sequence number of each of the N pictures relative to each of MVF reference pictures thereof, determine M second relative picture sequence numbers, where each of the M second relative picture sequence numbers is a picture sequence number of the to-be-processed picture relative to each of the M MCP reference pictures, obtain P×M scaling ratios, where each of the P×M scaling ratios is a ratio of each of the P first relative picture sequence numbers to each of the M second relative picture sequence numbers, and perform processing according to the following operation method for a $Q^{th}$ scaling ratio for each of the P×M scaling ratios in order to obtain the P×M second MVFs, where when a first relative picture sequence number corresponding to the $Q^{th}$ scaling ratio is a picture sequence number of a $U^{th}$ picture in the N pictures relative to a $V^{th}$ MVF reference picture of the $U^{th}$ picture, scaling process is performed on an MVF of the $U^{th}$ picture relative to the $V^{th}$ MVF reference picture of the $U^{th}$ picture according to a $Q^{th}$ scaling ratio to obtain the $Q^{th}$ second MVF.

It should be noted that, in this embodiment of the present application, scaling process is performed on the first MVF to obtain the second MVF. For example, scaling process may be performed on a known MVF mvf($t_1'$,$t_1$) to obtain a second MVF mvf(t',t), further, $$mvf(t', t) = mvf(t_1', t_1) \times \frac{t - t'}{t_1 - t_1'},$$

where t indicates a moment of the to-be-processed picture, t' indicates a moment of the MCP reference picture of the to-be-processed picture, $t_1$ indicates a moment of a picture located in the video frame sequence, $t_1'$ indicates a moment of an MVF reference picture of the picture located in the video frame sequence, and when $t_1$=t, mvf($t_1'$,$t_1$) indicates a first MVF of the to-be-processed picture.

Correspondingly, the MCP unit 407 is further configured to determine P×M MCP signals of the target sub picture block from corresponding MCP reference pictures according to each of the P×M second MVFs and based on the MCP algorithm, and the processing unit 409 is further configured to obtain P×M predictive picture signals of the target sub picture block according to each of the P×M MCP signals of the target sub picture block and residual signals of the target sub picture block, and select, from the P×M predictive picture signals, a predictive picture signal with lowest energy as the picture signal of the target sub picture block.

In another embodiment of the present application, when the first MVF set includes an MVF of each of N pictures relative to an MVF reference picture thereof, where N is an integer greater than or equal to 1, a total quantity of MVF reference pictures of the N pictures is P, the first MVF set includes P first MVFs, and P is an integer greater than or equal to N, the operation unit 405 is further configured to determine an optimal MVF from the P first MVFs, where the optimal MVF is a first MVF that makes energy of the prediction residual of the target sub picture block lowest in the P first MVFs, and when the optimal MVF is an MVF of an $E^{th}$ picture in the N pictures relative to a $G^{th}$ MVF reference picture in F MVF reference pictures of the $E^{th}$ picture, where E is an integer greater than or equal to 1 but less than or equal to N, F is an integer greater than or equal to 1, and G is an integer greater than or equal to 1 but less than or equal to F, determine a third relative picture sequence number, where the third relative picture sequence number is a picture sequence number of the $E^{th}$ picture relative to the $G^{th}$ MVF reference picture in the F MVF reference pictures of the $E^{th}$ picture, determine M second relative picture sequence numbers, where each of the M second relative picture sequence numbers is a picture sequence number of the to-be-processed picture relative to each of the M MCP reference pictures, and perform, according to a ratio of the third relative picture sequence number to each of the M second relative picture sequence numbers, scaling process on the MVF of the $E^{th}$ picture relative to the $G^{th}$ MVF reference picture in the F MVF reference pictures of the $E^{th}$ picture to obtain the M second MVFs.

Correspondingly, the MCP unit 407 is further configured to determine M MCP signals of the target sub picture block according to each of the M second MVFs and a corresponding MCP reference picture and based on the MCP algorithm, and the processing unit 409 is further configured to obtain M predictive picture signals of the target sub picture block according to the M MCP signals of the target sub picture block and the prediction residual of the target sub picture block, and select, from the M predictive picture signals, a predictive picture signal with lowest energy as the picture signal of the target sub picture block.

It should be noted that, in this embodiment of the present application, scaling process is performed on the first MVF to obtain the second MVF.

In still another embodiment of the present application, the first MVFs that participate in the vector operation include a first MVF mvf($t_1$,t) of the to-be-processed picture relative to a first picture, a first MVF mvf($t_2$,$t_1$) of the first picture relative to a second picture, a first MVF mvf($t_3$,$t_2$) of the second picture relative to a third picture, . . . , a first MVF mvf(t',$t_k$) of a $K^{th}$ picture relative to an MCP reference picture of the to-be-processed picture, where K is an integer greater than or equal to 3, and the operation unit 405 is further configured to obtain the second MVF mvf(t',t) according to a formula mvf(t',t)=mvf(t',$t_k$)+ . . . +mvf($t_3$,$t_2$)+mvf($t_2$,$t_1$)+mvf($t_1$,t).

It should be noted that, in this embodiment of the present application, the second MVF is obtained by concatenating multiple first MVFs. Assuming that the to-be-processed picture is a picture 1, and an MCP reference picture of the picture 1 is a picture 3, and a first MVF of the picture 1 in the video frame sequence relative to a picture 2 (an MVF reference picture of the picture 1) is mvf(2,1) and a first MVF of the picture 2 relative to the picture 3 (an MVF reference picture of the picture 2) is mvf(3,2), concatenation process may be performed on mvf(2,1) and mvf(3,2) to obtain a second MVF mvf(3,1) of the picture 1 relative to the picture 3. Further, mvf(3,1)=mvf(3,2)+mvf(2,1). As can be known, during a concatenation operation, an MVF reference picture of a previous MVF (for example, mvf(2,1)) is a picture that is located in the video frame sequence and included in a next MVF (for example, mvf(3,2)). Further, in the foregoing example, assuming that the to-be-processed picture is the picture 1, and the MCP reference picture of the picture 1 is the picture 3, and the first MVF of the picture 1 in the video frame sequence relative to the picture 2 (an MVF reference picture of the picture 1) is mvf(2,1), and a first MVF of the picture 2 relative to a picture 4 (an MVF reference picture of the picture 2) is mvf(4,2) to obtain the second MVF mvf(3,1) of the picture 1 relative to the picture 3, scaling process needs to be first performed on mvf(4,2) to obtain mvf(3,2), where $$mvf(3, 2) = mvf(4, 2) \times \frac{2-4}{2-3} = 2 \times mvf(4, 2),$$

and then concatenation process is performed on mvf(2,1) and mvf(3,2) to obtain mvf(3,1) where mvf(3,1)=mvf(3,2)+mvf(2,1).

As can be known, the technical solution provided by this embodiment of the present application includes the MCP unit 407 is configured to determine an MCP signal of a target sub picture block from M MCP reference pictures according to a second MVF and based on an MCP algorithm. The receiving unit 401 is configured to receive a coded signal of a prediction residual of the target sub picture block, and perform decoding process on the coded signal of the prediction residual of the target sub picture block to obtain the prediction residual of the target sub picture block, and the processing unit 409 is configured to obtain a picture signal of the target sub picture block according to the MCP signal of the target sub picture block and the prediction residual of the target sub picture block. In this solution, a quantity of MCP reference pictures is M, and M is an integer greater than or equal to 2. That is, in comparison with the other approaches, the technical solution provided by this embodiment of the present application supports MCP using multiple reference frames. In comparison with MCP using a single reference frame in the other approaches, in most cases, a prediction residual of a target sub picture block that is finally determined using this solution is less than a prediction residual of a target sub picture block when a single reference frame is used in the other approaches. Therefore, in most cases, coding efficiency of a target sub picture block is improved.

Embodiment 5

Figure 5:
FIG. 5 is a schematic structural diagram of a coding/decoding system according to an embodiment of the present application.

Referring to FIG. 5, this embodiment of the present application further provides a coding/decoding system, where the coding/decoding system includes an encoder 501 as in Embodiment 3 and a decoder 502 as in Embodiment 4.

The encoder 501 is configured to perform coding process on a picture signal to obtain a coding result of the picture signal, and send the coding result of the picture signal to the decoder 502.

The decoder 502 is configured to receive the coding result of the picture signal, and perform decoding process on the coding result of the picture signal to obtain the picture signal.

As can be known, because in the coding/decoding system provided by this embodiment of the present application, the encoder 501 has an advantage of improving coding efficiency of a target sub picture block in most cases as described in Embodiment 3, and the decoder 502 also has an advantage of improving coding efficiency of a target sub picture block in most cases as described in Embodiment 4, the coding/decoding system provided by this embodiment of the present application can also be used to improve coding efficiency of a target sub picture block in most cases.

It should be noted that the embodiments in this specification are all described in a progressive manner, for same or similar parts in the embodiments, reference may be made to these embodiments, and each embodiment focuses on a difference from other embodiments. In particular, for the embodiments of the encoder 501, the decoder 502, and the coding/decoding system, because the embodiments are basically similar to the embodiment of the video coding/decoding method, descriptions are brief. For related parts, refer to the descriptions in the method embodiment.

The described apparatus embodiment is merely an example. The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments. In addition, in the accompanying drawings of the apparatus embodiments provided by the present application, connection relationships between units indicate that the units have communication connections with each other, which may be implemented as one or more communications buses or signal cables. A person of ordinary skill in the art may understand and implement the embodiments of the present application without creative efforts.

A person of ordinary skill in the art may understand that all or a part of the steps of the methods in the embodiments may be implemented by a program instructing relevant hardware. The program may be stored in a computer readable storage medium. The storage medium may include a read-only memory (ROM), a random access memory (RAM), a magnetic disk, or an optical disc.

The video coding/decoding method, encoder, decoder, and coding/decoding system provided by the embodiments of the present application are described in detail above. The principle and implementation of the present application are described herein using specific examples. The description of the embodiments is merely intended to help understand the method and core ideas of the present application. In addition, a person skilled in the art can make variations and modifications to the present application in terms of specific implementations and application scopes according to the ideas of the present application. Therefore, the content of the specification shall not be construed as a limit to the present application.

What is claimed is:

1. A video decoding method, comprising:
receiving compression coded data of a first motion vector field (MVF) set;
performing decoding processing on the compression coded data to obtain the first MVF set, wherein the first MVF set comprises an MVF of a picture relative to one or more MVF reference pictures, wherein the picture is located in a video frame sequence, wherein an MVF reference picture that corresponds to the picture is located in the video frame sequence, and wherein the picture is different from the MVF reference picture;
receiving coded data comprising identification information;
performing decoding processing on the coded data to obtain the identification information, wherein the identification information marks a first MVF in the first MVF set that participates in a vector operation, wherein the first MVF participates in the vector operation according to a preset vector operation method to obtain a second MVF, wherein the second MVF is an MVF of a target sub picture block in a to-be-processed picture relative to each of M motion compensation prediction (MCP) reference pictures of the to-be-processed picture, wherein the to-be-processed picture is located in the video frame sequence, wherein the to-be-processed picture is divided into a plurality of non-overlapping sub picture blocks, wherein the target sub picture block is located in the non-overlapping sub picture blocks, wherein the M MCP reference pictures are coded pictures in the video frame sequence or are intermediate pictures, wherein the intermediate pictures are obtained by processing the coded pictures in the first video frame sequence, and wherein M is an integer greater than or equal to two;
determining, according to the first MVF set and the identification information, the first MVF that participates in the vector operation;
receiving coded data of the preset vector operation method;
performing the decoding processing on the coded data of the preset vector operation method to obtain the preset vector operation method;
obtaining, according to the preset vector operation method, a plurality of second MVFs according to first MVFs that participate in the vector operation, wherein the first MVFs that participate in the vector operation comprise a first MVF of the to-be-processed picture relative to a first picture (mvf($t_1$,t)), a first MVF of an $(n-1)^{th}$ picture relative to an $n^{th}$ picture (mvf($t_n$,$t_{n-1}$)), a first MVF of a $K^{th}$ picture relative to an MCP reference picture of the to-be-processed picture (mvf(t',$t_k$)), wherein K is an integer greater than or equal to three, wherein n is an integer greater than or equal to one;

determining an MCP signal of the target sub picture block from the M MCP reference pictures according to the second MVFs and based on an MCP algorithm;

receiving a coded signal of a prediction residual of the target sub picture block;

performing decoding processing on the coded signal of the prediction residual of the target sub picture block to obtain the prediction residual of the target sub picture block; and obtaining a picture signal of the target sub picture block according to the MCP signal of the target sub picture block and the prediction residual of the target sub picture block.

2. The method of claim 1, wherein obtaining the picture signal of the target sub picture block comprises adding a pixel value of a corresponding pixel in the prediction residual of the target sub picture block to a pixel value of each pixel that is part of the MCP signal of the target sub picture block, wherein the MCP signal of the target sub picture block comprises a plurality of pixels and the prediction residual of the target sub picture block comprises a plurality of pixels, and wherein for each pixel that is part of the MCP signal of the target sub picture block, a corresponding pixel exists in the prediction residual of the target sub picture block.

3. The method of claim 1, wherein when the first MVFs that participate in the vector operation comprise an MVF of each of N pictures relative to an MVF reference picture thereof, wherein a total quantity of MVF reference pictures of the N pictures is P, wherein N is an integer greater than or equal to 1, wherein P is an integer greater than or equal to N, and wherein obtaining the plurality of second MVFs comprises:

determining P first relative picture sequence numbers, wherein each of the P first relative picture sequence numbers is a picture sequence number of each of the N pictures relative to each of the MVF reference pictures thereof;

determining M second relative picture sequence numbers, wherein each of the M second relative picture sequence numbers is a picture sequence number of the to-be-processed picture relative to each of the M MCP reference pictures;

obtaining P×M scaling ratios, wherein each of the P×M scaling ratios is a ratio of each of the P first relative picture sequence numbers to each of the M second relative picture sequence numbers; and performing processing according to an operation method for a $Q^{th}$ scaling ratio for each of the P×M scaling ratios in order to obtain P×M second MVFs, and wherein when a first relative picture sequence number corresponding to the $Q^{th}$ scaling ratio is a picture sequence number of a $U^{th}$ picture in the N pictures relative to a $V^{th}$ MVF reference picture of the $U^{th}$ picture, scaling processing is performed on an MVF of the $U^{th}$ picture relative to the $V^{th}$ MVF reference picture of the $U^{th}$ picture according to the $Q^{th}$ scaling ratio to obtain a $Q^{th}$ second MVF.

4. The method of claim 3, wherein determining the MCP signal of the target sub picture block comprises determining P×M MCP signals of the target sub picture block from corresponding MCP reference pictures according to each of the P×M second MVFs and based on the MCP algorithm.

5. The method of claim 4, wherein obtaining the picture signal of the target sub picture block comprises:

obtaining P×M predictive picture signals of the target sub picture block according to each of the P×M MCP signals of the target sub picture block and residual signals of the target sub picture block; and selecting, from the P×M predictive picture signals, a predictive picture signal with lowest energy as the picture signal of the target sub picture block.

6. The method of claim 1, wherein when the first MVF set comprises an MVF of each of N pictures relative to an MVF reference picture thereof, wherein N is an integer greater than or equal to 1, wherein a total quantity of MVF reference pictures of the N pictures is P, wherein the first MVF set comprises P first MVFs, and wherein P is an integer greater than or equal to N, obtaining the plurality of second MVFs comprises:

determining an optimal MVF from the P first MVFs, wherein the optimal MVF is a first MVF that makes energy of the prediction residual of the target sub picture block lowest in the P first MVFs; and determining a third relative picture sequence number when the optimal MVF is an MVF of an $E^{th}$ picture in the N pictures relative to a $G^{th}$ MVF reference picture in F MVF reference pictures of the $E^{th}$ picture, wherein E is an integer greater than or equal to 1 but less than or equal to N, wherein F is an integer greater than or equal to 1, wherein G is an integer greater than or equal to 1 but less than or equal to F, wherein the third relative picture sequence number is a picture sequence number of the $E^{th}$ picture relative to the $G^{th}$ MVF reference picture in the F MVF reference pictures of the $E^{th}$ picture;

determining M second relative picture sequence numbers, wherein each of the M second relative picture sequence numbers is a picture sequence number of the to-be-processed picture relative to each of the M MCP reference pictures; and performing, according to a ratio of the third relative picture sequence number to each of the M second relative picture sequence numbers, scaling processing on the MVF of the $E^{th}$ picture relative to the $G^{th}$ MVF reference picture in the F MVF reference pictures of the $E^{th}$ picture to obtain M second MVFs.

7. The method of claim 6, wherein determining the MCP signal of the target sub picture block comprises determining M MCP signals of the target sub picture block according to each of the M second MVFs and a corresponding MCP reference picture and based on the MCP algorithm.

8. The method of claim 7, wherein obtaining the picture signal of the target sub picture block comprises:

obtaining M predictive picture signals of the target sub picture block according to the M MCP signals of the target sub picture block and the prediction residual of the target sub picture block; and selecting, from the M predictive picture signals, a predictive picture signal with lowest energy as the picture signal of the target sub picture block.

9. The method of claim 1, wherein obtaining the plurality of second MVFs comprises obtaining the second MVF according to a formula $$mvf(t', t) = mvf(t', t_k) + \sum_{n=2}^{k} mvf(t_n, t_{n-1}) + mvf(t_1, t),$$

and wherein mvf(t', t) is the second MVF.

10. An encoder, comprising:
a processor; and
a non-transitory computer-readable medium coupled to the processor and configured to store computer executable instructions, wherein the computer executable instructions cause the processor to be configured to:
obtain a first motion vector field (MVF) set, wherein the first MVF set comprises an MVF of a picture relative to one or more MVF reference pictures, wherein the picture is located in a video frame sequence, wherein an MVF reference picture of the picture is located in the video frame sequence, wherein the picture is different from the MVF reference picture;
obtain, based on a preset vector operation method, a plurality of second MVFs according to the first MVF set, wherein the first MVF set comprises first MVFs that participate in a vector operation and comprise a first MVF of the to-be-processed picture relative to a first picture ($mvf(t_1, t)$), a first MVF of an $(n-1)^{th}$ picture relative to an $n^{th}$ Picture ($mvf(t_n, t_{n-1})$), a first MVF of a $K^{th}$ picture relative to an MCP reference picture of the to-be-processed picture ($mvf(t', t_k)$), wherein K is an integer greater than or equal to three, wherein n is an integer greater than or equal to one, wherein each of the second MVFs is an MVF of a target sub picture block in the to-be-processed picture relative to each of M MCP reference pictures of the to-be-processed picture, wherein the to-be-processed picture is located in the one video frame sequence, wherein the to-be-processed picture is divided into a plurality of non-overlapping sub picture blocks, wherein the target sub picture block is located in the non-overlapping sub picture blocks, wherein the M MCP reference pictures are coded pictures in the video frame sequence or are intermediate pictures obtained by processing the coded pictures in the one video frame sequence, and wherein M is an integer greater than or equal to two;
determine an MCP signal of the target sub picture block from the M MCP reference pictures according to the second MVFs and based on an MCP algorithm;
obtain a prediction residual of the target sub picture block according to a picture signal of the target sub picture block and the MCP signal of the target sub picture block;
perform coding processing on the prediction residual of the target sub picture block to obtain a coded signal of the prediction residual of the target sub picture block; and
send the coded signal of the prediction residual of the target sub picture block to a peer decoder.

11. The encoder of claim 10, wherein when obtaining the prediction residual of the target sub picture block, the computer executable instructions further cause the processor to be configured to subtract a pixel value of a corresponding pixel in the MCP signal of the target sub picture block from a pixel value of each pixel that is part of the picture signal of the target sub picture block, wherein the picture signal of the target sub picture block comprises a plurality of pixels, wherein the MCP signal of the target sub picture block also comprises a plurality of pixels, and wherein for each pixel that is part of the picture signal of the target sub picture block, the corresponding pixel exists in the MCP signal of the target sub picture block.

12. The encoder of claim 10, wherein when the at least one picture comprises the to-be-processed picture, a quantity of MVF reference pictures of the to-be-processed picture is less than or equal to M.

13. The encoder of claim 10, wherein after obtaining the plurality of second MVFs, the computer executable instructions further cause the processor to be configured to:
determine a first MVF located in the first MVF set and participates in an operation, wherein the first MVF that participates in the operation is a first MVF that participates in the preset vector operation method to obtain a second MVF;
mark the first MVF located in the first MVF set and participates in the operation to obtain identification information used to mark the first MVF that participates in the operation;
perform coding processing on the identification information to obtain coded data of the identification information; and
send the coded data to the peer decoder.

14. The encoder of claim 10, wherein the computer executable instructions further cause the processor to be configured to:
perform coding processing on the preset vector operation method to obtain coded data of the preset vector operation method; and
send the coded data of the preset vector operation method to the peer decoder.

15. The encoder of claim 10, wherein after obtaining the first MVF set, and before obtaining the plurality of second MVFs, the computer executable instructions further cause the processor to be configured to perform lossy compression coding processing on the first MVF set to obtain lossy compression coded data of the first MVF set.

16. The encoder of claim 15, wherein the computer executable instructions further cause the processor to be configured to:
perform decoding processing on the lossy compression coded data of the first MVF set to obtain a third MVF set; and
obtain the plurality of second MVFs according to the third MVF set, a picture sequence number of each of the at least one picture, and a picture sequence number of the MVF reference picture thereof, and based on the preset vector operation method.

17. The encoder of claim 15, wherein the computer executable instructions further cause the processor to be configured to transmit the lossy compression coded data of the first MVF set to the peer decoder.

18. The encoder of claim 10, wherein after obtaining the first MVF set, and before obtaining the plurality of second MVFs, the computer executable instructions further cause the processor to be configured to perform lossless compression coding processing on the first MVF set to obtain lossless compression coded data of the first MVF set.

19. The encoder of claim 18, wherein the computer executable instructions further cause the processor to be configured to:
perform decoding processing on the lossless compression coded data of the first MVF set to obtain the first MVF set; and
obtain the plurality of second MVFs according to the first MVF set, a picture sequence number of each of the at least one picture, and a picture sequence number of the MVF reference picture thereof, and based on the preset vector operation method.

20. A decoder, comprising:

a processor; and a non-transitory computer-readable medium coupled to the processor and configured to store computer executable instructions, wherein the computer executable instructions cause the processor to be configured to:

receive compression coded data of a first motion vector field (MVF) set;

perform decoding processing on the compression coded data to obtain the first MVF set, wherein the first MVF set comprises an MVF of a picture relative to one or more MVF reference pictures thereof, wherein the picture is located in a video frame sequence, wherein an MVF reference picture that corresponds to the picture is located in the video frame sequence, and wherein the picture is different from the MVF reference picture;

receive coded data of identification information;

perform decoding processing on the coded data to obtain the identification information, wherein the identification information marks a first MVF of the first MVF set that participates in a vector operation, wherein the first MVF that participates in the vector operation is an MVF that participates in the vector operation according to a preset vector operation method to obtain a second MVF, wherein the second MVF is an MVF of a target sub picture block in a to-be-processed picture relative to each of M motion compensation prediction (MCP) reference pictures of the to-be-processed picture, wherein the to-be-processed picture is located in the first video frame sequence, wherein the to-be-processed picture is divided into a plurality of non-overlapping sub picture blocks, wherein the target sub picture block is located in the non-overlapping sub picture blocks, wherein the M MCP reference pictures are coded pictures in the video frame sequence or intermediate pictures, wherein the intermediate pictures are obtained by processing the coded pictures in the video frame sequence, and wherein M is an integer greater than or equal to two;

determine, according to the first MVF set and the identification information that marks the first MVF, the first MVF that participates in the vector operation;

receive coded data of the preset vector operation method;

perform decoding processing on the coded data of the preset vector operation method to obtain the preset vector operation method;

obtain, according to the preset vector operation method, a plurality of second MVFs according to first MVFs that participate in the vector operation, wherein the first MVFs that participate in the vector operation comprise a first MVF of the to-be-processed picture relative to a first picture (mvf)($t_1$,t)), a first MVF of an $(n-1)^{th}$ picture relative to an $n^{th}$ picture (mvf($t_n$, $t_{n-1}$)), a first MVF of a $K^{th}$ picture relative to an MCP reference picture of the to-be-processed picture (mvf (t',$t_k$)), wherein K is an integer greater than or equal to three, wherein n is an integer greater than or equal to one;

determine an MCP signal of the target sub picture block from the M MCP reference pictures according to the second MVFs and based on an MCP algorithm;

receive a coded signal of a prediction residual of the target sub picture block;

perform decoding processing on the coded signal of the prediction residual of the target sub picture block to obtain the prediction residual of the target sub picture block; and obtain a picture signal of the target sub picture block according to the MCP signal of the target sub picture block and the prediction residual of the target sub picture block.

* * * * *

UNITED STATES PATENT AND TRADEMARK OFFICE
CERTIFICATE OF CORRECTION

PATENT NO. : 10,554,997 B2  
APPLICATION NO. : 15/797728  
DATED : February 4, 2020  
INVENTOR(S) : Hong Zhang and Haitao Yang Page 1 of 1

It is certified that error appears in the above-identified patent and that said Letters Patent is hereby corrected as shown below:

On the Title Page

Page 2 Item (56), Other Publications, Line 9: "Black-Based" should read "Block-Based"

In the Claims

Claim 10, Column 39, Line 22: "Picture (mvf" should read "picture (mvf"

Claim 11, Column 40, Line 21: "data to" should read "data of the identification information to"

Claim 20, Column 41, Line 19: "data to" should read "data of the identification information to"

Signed and Sealed this  
Twenty-fourth Day of March, 2020

Andrei Iancu  
*Director of the United States Patent and Trademark Office*